(12) United States Patent
Gelman et al.

(10) Patent No.: US 9,933,753 B2
(45) Date of Patent: Apr. 3, 2018

(54) INCREASING AN AREA FROM WHICH RECONSTRUCTION FROM A COMPUTER GENERATED HOLOGRAM MAY BE VIEWED

(71) Applicant: Real View Imaging Ltd., Yokneam (IL)

(72) Inventors: Shaul Alexander Gelman, RaAnana (IL); Shlomo Alon-Braitbart, Haifa (IL); Yuval Yehuda Yoreh, Yehud (IL); Carmel Rotschild, Ganei-Tikva (IL)

(73) Assignee: Real View Imaging Ltd., Yokneam (IL)

( * ) Notice: Subject to any disclaimer, the term of this patent is extended or adjusted under 35 U.S.C. 154(b) by 0 days.

(21) Appl. No.: 14/418,994

(22) PCT Filed: Jul. 30, 2013

(86) PCT No.: PCT/IL2013/050648
§ 371 (c)(1),
(2) Date: Feb. 2, 2015

(87) PCT Pub. No.: WO2014/020603
PCT Pub. Date: Feb. 6, 2014

(65) Prior Publication Data
US 2015/0168914 A1 Jun. 18, 2015

Related U.S. Application Data

(60) Provisional application No. 61/678,211, filed on Aug. 1, 2012, provisional application No. 61/678,213, filed on Aug. 1, 2012.

(51) Int. Cl.
*G03H 1/08* (2006.01)
*G03H 1/30* (2006.01)
(Continued)

(52) U.S. Cl.
CPC ........... *G03H 1/32* (2013.01); *G02B 27/0093* (2013.01); *G03H 1/2205* (2013.01);
(Continued)

(58) Field of Classification Search
CPC .......... G03H 1/08; G03H 1/22; G03H 1/0808; G03H 1/26; G03H 1/2205;
(Continued)

(56) References Cited

U.S. PATENT DOCUMENTS 4,585,297 A * 4/1986 Hamaguchi .......... G02B 26/122
359/17
8,441,703 B2 * 5/2013 Leister ................. G03H 1/0808
359/32
(Continued)

FOREIGN PATENT DOCUMENTS

WO WO 2003/021363 3/2003
WO WO 2010/004563 1/2010
(Continued)

OTHER PUBLICATIONS

Communication Relating to the Results of the Partial International Search dated Nov. 8, 2013 From the International Searching Authority Re. Application No. PCT/IL2013/050647.
(Continued)

*Primary Examiner* — Bumsuk Won
*Assistant Examiner* — Henry Duong

(57) ABSTRACT

A method of enlarging an observation window from which the reconstruction from a Computer Generated Hologram (CGH) may be viewed, including reproducing a CGH, and shifting a location of an exit pupil or observation window of an optical system reproducing the CGH. A method of increasing a viewing angle from which the reconstruction from a Computer Generated Hologram (CGH) may be seen, including producing a plurality of instances of a CGH,
(Continued)

projecting each one of the instances in a different direction so that a first exit pupil of a first instance is close to a second exit pupil of a second instance. An optical system including a plurality of exit pupils associated with a plurality of optical components, further including a light deflector for jittering a location of a first exit pupil so as to increase an overlap of the first exit pupil with a second exit pupil. Related apparatus and methods are also described.

20 Claims, 17 Drawing Sheets

(51) Int. Cl.
  *G03H 1/32* (2006.01)
  *G03H 1/22* (2006.01)
  *G02B 27/00* (2006.01)
  *G03H 1/02* (2006.01)
  *G03H 1/26* (2006.01)

(52) U.S. Cl.
  CPC ......... *G03H 1/2249* (2013.01); *G03H 1/2294* (2013.01); *G03H 1/26* (2013.01); *G03H 1/30* (2013.01); *G03H 2001/0216* (2013.01); *G03H 2001/0816* (2013.01); *G03H 2001/2236* (2013.01); *G03H 2001/2239* (2013.01); *G03H 2001/2242* (2013.01); *G03H 2001/2271* (2013.01); *G03H 2001/2292* (2013.01); *G03H 2001/2297* (2013.01); *G03H 2001/262* (2013.01); *G03H 2001/2605* (2013.01); *G03H 2210/30* (2013.01); *G03H 2210/36* (2013.01); *G03H 2222/18* (2013.01); *G03H 2222/33* (2013.01); *G03H 2223/18* (2013.01); *G03H 2223/19* (2013.01); *G03H 2223/24* (2013.01); *G03H 2226/05* (2013.01); *G03H 2227/03* (2013.01); *G03H 2240/50* (2013.01)

(58) Field of Classification Search
  CPC ......... G03H 2001/2605; G03H 1/2294; G03H 1/30; G03H 1/32; G03H 2001/0216; G03H 2001/0816; G03H 2001/2236; G03H 2001/2239; G03H 2001/2242; G03H 2001/2271; G03H 1/2249; G03H 2001/2297; G03H 2226/05; G03H 2222/18; G03H 2210/30; G03H 2223/18; G03H 2240/50; G03H 2001/2292; G03H 2223/19; G03H 2210/36; G03H 2001/262; G03H 2223/24; G03H 2222/33; G03H 2227/03; G02B 27/0093
  USPC .................................................. 359/9
  See application file for complete search history.

(56) References Cited

U.S. PATENT DOCUMENTS

| | | | |
|---|---|---|---|
| 2004/0004586 A1* | 1/2004 | Endo | G02B 27/0172 345/32 |
| 2006/0172008 A1 | 8/2006 | Yayon et al. | |
| 2010/0097672 A1 | 4/2010 | Leister | |
| 2010/0188719 A1 | 7/2010 | Leister | |
| 2010/0194745 A1 | 8/2010 | Leister et al. | |
| 2010/0202725 A1 | 8/2010 | Popovich et al. | |
| 2011/0063289 A1* | 3/2011 | Gantz | G03H 1/02 345/419 |
| 2011/0128555 A1 | 6/2011 | Rotschild et al. | |
| 2011/0158508 A1 | 6/2011 | Shpunt et al. | |
| 2011/0317130 A1 | 12/2011 | Gollier | |
| 2015/0234351 A1 | 8/2015 | Alon-Braitbart et al. | |

FOREIGN PATENT DOCUMENTS

| | | |
|---|---|---|
| WO | WO 2014/020602 | 2/2014 |
| WO | WO 2014/020603 | 2/2014 |

OTHER PUBLICATIONS

Communication Relating to the Results of the Partial International Search dated Dec. 10, 2013 From the International Searching Authority Re. Application No. PCT/IL2013/050648.
International Preliminary Report on Patentability dated Dec. 2, 2014 From the International Preliminary Examining Authority Re. Application No. PCT/IL2013/050647.
International Preliminary Report on Patentability dated Dec. 2, 2014 From the International Preliminary Examining Authority Re. Application No. PCT/IL2013/050648.
International Search Report and the Written Opinion dated Mar. 25, 2014 From the International Searching Authority Re. Application No. PCT/IL2013/050648.
International Search Report and the Written Opinion dated Jan. 28, 2014 From the International Searching Authority Re. Application No. PCT/IL2013/050647.
Written Opinion dated Aug. 27, 2014 From the International Preliminary Examining Authority Re. Application No. PCT/IL2013/050647.
Written Opinion dated Aug. 27, 2014 From the International Preliminary Examining Authority Re. Application No. PCT/IL2013/050648.
Fukaya et al. "Eye-Position Tracking Type Electro-Holographic Display Using Liquid Crystal Devices", Asia Display '95, XP002940561, S36-5: 963-964, Jan. 1, 1995.
Hecht "Geometrical Optics: Stops: Aperture and Field Stops; Entrance and Exit Pupils; Relative Aperture and F-Number", Optics, XP002715216, Chap.5.3: 173-177, 1998. Para [5.3.2], Figs. 5.37, 5.38.
Restriction Official Action dated May 16, 2016 From the US Patent and Trademark Office Re. U.S. Appl. No. 14/418,956.
Popovich et al.
Official Action dated Aug. 25, 2016 From the US Patent and Trademark Office Re. U.S. Appl. No. 14/418,956.
Notice of Allowance dated Jan. 23, 2017 From the US Patent and Trademark Office Re. U.S. Appl. No. 14/418,956. (11 pages).
Communications Pursuant to Article 94(3) EPC dated May 31, 2017 From the European Patent Office Re. Application No. 13759317.4. (9 Pages).
Communication Under Rule 164(2)(a) EPC dated May 31, 2017 From the European Patent Office Re. Application No. 13759024.6. (4 Pages).
Kelly et al. "Fresnel and Fourier Digital Holography Architectures: A Comparison", Springers Word Document Template, Fringe 2009, p. 1-5, Published Online Nov. 23, 2009.
Maeno et al. "Electro Holographic Display Using 15 Mega Pixels LCD", Practical Holography X, Proceedings of the SPIE, 2652: Mar. 15-23, 1996.
Mishina et al. "Viewing Zone Enlargement Method for Sampled Hologram That Uses High Order Diffraction", Applied Optics, 41(8): 1489-1499, Mar. 10, 2002.

* cited by examiner

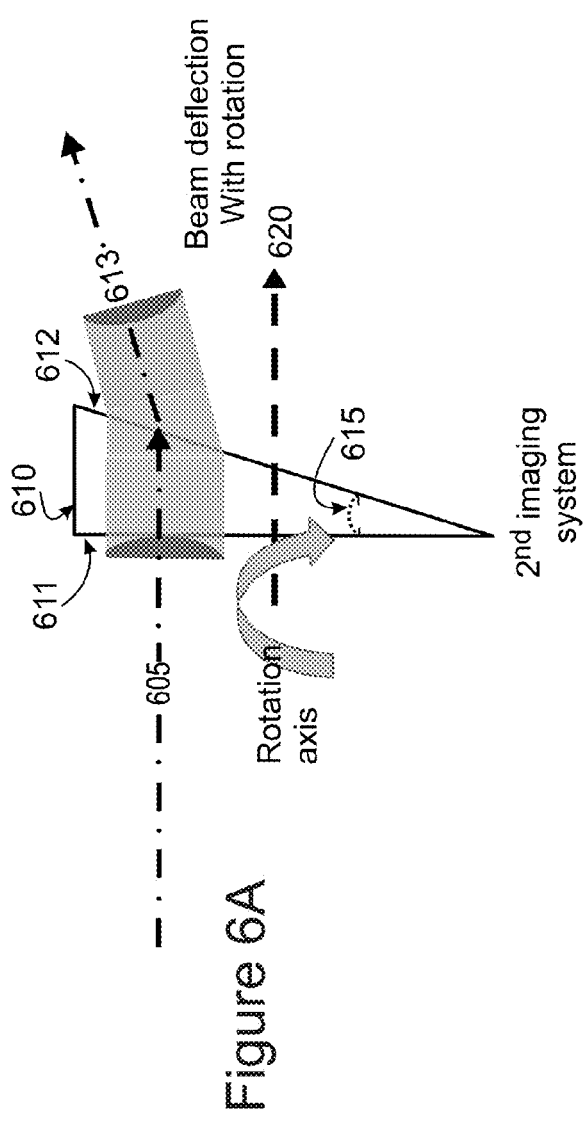
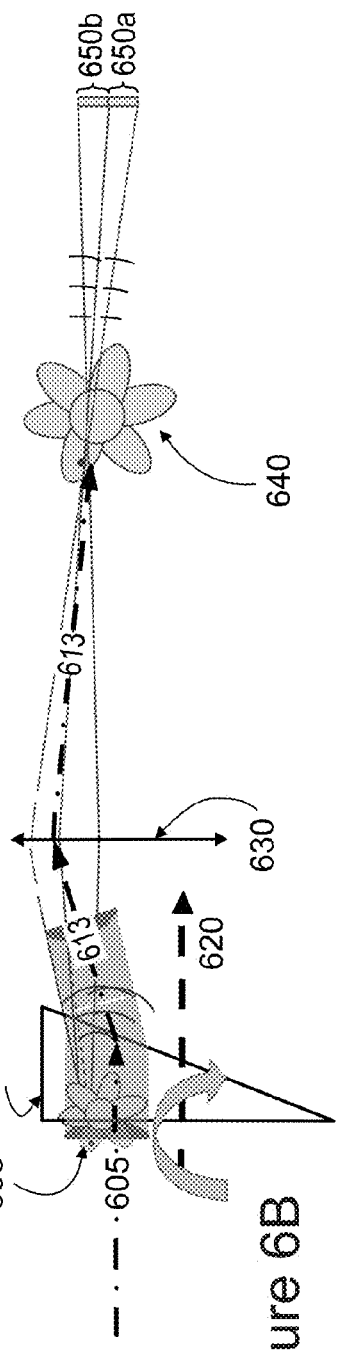
Figure 6A
Figure 6B

INCREASING AN AREA FROM WHICH RECONSTRUCTION FROM A COMPUTER GENERATED HOLOGRAM MAY BE VIEWED

RELATED APPLICATIONS

This application is a National Phase of PCT Patent Application No. PCT/IL2013/050648 having International filing date of Jul. 30, 2013, which claims the benefit of priority under 35 USC § 119(e) of U.S. Provisional Patent Application No. 61/678,213 filed Aug. 1, 2012 and U.S. Provisional Patent Application No. 61/678,211 filed Aug. 1, 2012. The contents of all of the above applications are incorporated by reference as if fully set forth herein in their entirety.

FIELD AND BACKGROUND OF THE INVENTION

The present invention, in some embodiments thereof, relates to Computer Generated Holograms (CGHs) and, more particularly, but not exclusively, to methods and apparatus for increasing an observing window through which a CGH can be viewed.

CGHs may be produced by projecting coherent light onto computer controlled Spatial Light Modulators (SLMs). The SLMs include an array of light modulators which are programmed by a computer to modulate light, so that light coming off the SLM (passing through or reflected off the SLM) produces a hologram.

The term SLM is used herein to describe a device which produces holograms. In some embodiments, the device is an SLM which modulates light which illuminates the SLM, acting by reflection or by transmission, however, the term is also meant to include an array which both produces light and modulates the light in order to produce a CGH.

An observation window of a CGH is limited in size. An observation window of a CGH is typically small, approximately a size of a person's pupil.

The small size limits the angles from which a viewer can view an image of the CGH.

In some implementations of CGH-producing systems, such as, for example, an implementation described in PCT published patent application WO 2010/004563 by Rotschild et al, a viewer tracking system is used to direct the observation window to a viewer's eyes. For a small size observing window, viewing is not easy in case of a stationary position, and in case of a moving viewer accuracy and cost of a viewer tracking system can affect usability and cost of the CGH-producing systems.

An ability to increase a size of an observing window can have a large impact on the field of 3D holographic devices, both for stationary viewing positions and for dynamic/tracking related viewing positions.

Background art includes:

K. Maeno, N. Fukaya, O. Nishikawa, "Electro holographic display using 15 Mega pixels LCD", Advanced 3D Telecommunication Project 1996, SPIE Vol. 2652;

T. Mishina, M. Okui, F. Okano, "Viewing zone enlargement method for sampled hologram that uses high order diffraction", Applied Optics 2002, Vol. 41, No. 8;

PCT Published Patent Application WO 2010/004563;
U.S. Published Patent Application 2006/0172008;
PCT Published Patent Application WO 2003/021363; and An article titled: "Fresnel and Fourier digital holography architectures: a comparison" by Damien P., David S. Monaghan, Nitesh Pandey, Bryan M. Hennelly.

The disclosures of all references mentioned above and throughout the present specification, as well as the disclosures of all references mentioned in those references, are hereby incorporated herein by reference.

SUMMARY OF THE INVENTION

The present invention, in some embodiments thereof, increases an area from which a CGH may be viewed.

In some embodiments of the invention, an element in an optical system projecting the CGH is used to jitter, or deflect, a direction of projection of the CGH, relative to a direction of a central ray of the projection, so as to cause an observation window from which the CGH is observed to be seen from a broader area than may be seen when a steady direction is kept.

In some embodiments of the invention, an element in an optical system projecting the CGH is used to jitter, or shift, a location of an exit pupil of the optical system, so as to cause an observation window from which the CGH is observed to be seen from a larger area and/or volume than may be seen when a steady location is maintained.

An observation window which is enlarged by jittering about a direction of a central ray in an optical system and/or moving an exit pupil of the optical system is termed herein a jittered or a shifted observation window.

The term "observation window" in all its grammatical forms is used throughout the present specification and claims interchangeably with the term "observing window" and its corresponding grammatical forms.

In some embodiments of the invention, the optical system projecting the CGH is used to produce several directions of projection of the CGH, so as to produce several observation windows adjacent to each other, termed herein scattered observation windows. In some embodiments of the invention adjacent observations windows are non-overlapping.

In some embodiments of the invention, scattered observation windows are also shifted, combining the devices and methods taught for shifting with the devices and methods taught for producing scattered windows.

In some embodiments of the invention, the CGH is optionally a shell of a three dimensional object, that is, an image of a surface of the object.

In some embodiments of the invention, when the angle between projection directions of the jittered observation window, or the several adjacent observation windows, is small, the same CGH is optionally presented to the viewer, without compensating for the small shift in viewing direction. A viewer gains the benefit of the larger observation window, without suffering from the image not appearing to slightly rotate when the viewer's head is slightly moved.

According to an aspect of some embodiments of the present invention there is provided a method of enlarging an observation window from which a Computer Generated Hologram (CGH) may be viewed, including producing a CGH, and shifting a location of an exit pupil of an optical system producing the CGH.

According to some embodiments of the invention, the observation window is enlarged laterally by deflecting a direction of projection of the exit pupil of the CGH relative to a direction of a central ray of the projection.

According to some embodiments of the invention, the observation window is enlarged along a viewing direction by shifting an optical element along the direction of a central ray of the projection.

According to some embodiments of the invention, further including tracking a distance of a viewer from the optical system, and shifting the exit pupil to correspond to the distance of the viewer from the optical system.

According to some embodiments of the invention, further including maintaining a same location of a scene displayed by the CGH.

According to some embodiments of the invention, an area of the observation window is doubled. According to some embodiments of the invention, a solid viewing angle covered by the observation window is quadrupled. According to some embodiments of the invention, the enlarged observation window is larger than an observer's input pupil.

According to some embodiments of the invention, the producing a CGH includes illuminating a computer controlled Spatial Light Modulator (SLM) using coherent light, thereby modulating the coherent light.

According to some embodiments of the invention, the producing a CGH includes projecting coherent light from a plurality of coherent light sources having a plurality of different colors onto one or more SLMs, thereby producing a plurality of different colored CGHs, and jittering locations of exit pupils of the different colored CGHs to substantially overlap the different colored CGH exit pupils.

According to some embodiments of the invention, the shifting includes scanning the exit pupil across an observer's input pupil. According to some embodiments of the invention, the scanning is performed at a rate greater than 10 times per second.

According to some embodiments of the invention, the producing a CGH includes projecting coherent light from a plurality of coherent light sources having a plurality of different colors onto one or more SLMs, and the scanning is performed at a rate greater than 10 times per second per color.

According to some embodiments of the invention, the shifting includes deflecting the direction in one dimension. According to some embodiments of the invention, the shifting includes deflecting the direction in two dimensions.

According to some embodiments of the invention, the shifting is performed by changing a deflection direction of an image deflector located at a location of a real image of the GGH.

According to some embodiments of the invention, the shifting is performed by changing a deflection direction of an image deflector located at a symmetry location of an optical system for projecting the CGH.

According to some embodiments of the invention, the changing a deflection direction of the image deflector includes rotating the image deflector.

According to some embodiments of the invention, further including re-imaging the real image in a direction of the exit pupil.

According to some embodiments of the invention, the image deflector includes a mirror. According to some embodiments of the invention, the image deflector includes a prism. According to some embodiments of the invention, the image deflector includes a tilted optical window.

According to some embodiments of the invention, the CGH is of a shell of a three dimensional object.

According to some embodiments of the invention, if the shifting includes deflecting by an angle smaller than a threshold angle, the CGH produced by the SLM is not changed to compensate for the change in direction.

According to some embodiments of the invention, the SLM is controlled so as to produce a CGH of a shell relative to an observation point at an approximate distance of the exit pupil.

According to some embodiments of the invention, the SLM is controlled so as to produce a CGH of a shell relative to a vector.

According to an aspect of some embodiments of the present invention there is provided a method of increasing a viewing angle from which a Computer Generated Hologram (CGH) may be viewed, including producing a CGH, and moving a location of an exit pupil of the CGH relative to a location of an observer by deflecting a direction of projection of the exit pupil of the CGH.

According to an aspect of some embodiments of the present invention there is provided a method of increasing a viewing angle from which a Computer Generated Hologram (CGH) may be seen, including producing a plurality of instances of a CGH, projecting each one of the instances in a different direction so that a first exit pupil of a first instance is close to a second exit pupil of a second instance.

According to some embodiments of the invention, the first exit pupil of the first instance does not overlap the second exit pupil of the second instance.

According to some embodiments of the invention, a distance of the first exit pupil of the first instance from the second exit pupil of the second instance is less than a size of an observer's input pupil.

According to some embodiments of the invention, the first exit pupil of the first instance is adjoining to the second exit pupil of the second instance.

According to some embodiments of the invention, further including moving a location of at least the first exit pupil of the first instance of the CGH.

According to some embodiments of the invention, further including also moving a location of the second exit pupil of the second instance of the CGH.

According to some embodiments of the invention, the producing a plurality of instances of the CGH includes passing modulated light through a beam splitter, thereby splitting off a first instance of the CGH in a first direction and a second instance of the CGH in a second direction.

According to some embodiments of the invention, the CGH is of a shell of a three dimensional object.

According to some embodiments of the invention, if a first direction of projection of a first CGH differs from a second direction of projection of a second CGH by an angle smaller than a threshold angle, the modulation of the light by the SLM is not changed to compensate for the difference in direction.

According to some embodiments of the invention, the SLM is controlled so as to produce a CGH of a shell relative to an observation point at an approximate distance of the exit pupils.

According to some embodiments of the invention, the SLM is controlled so as to produce a CGH of a shell relative to a vector.

According to an aspect of some embodiments of the present invention there is provided an optical system including a plurality of exit pupils associated with a plurality of optical components, further including a light deflector for jittering a location of a first exit pupil so as to increase an overlap of the first exit pupil with a second exit pupil.

According to some embodiments of the invention, the jittering is by changing a deflection direction of an image deflector located at a location of an image produced in the optical system.

According to some embodiments of the invention, the jittering is by changing a deflection direction of an image deflector located at a symmetry location of the optical system.

According to some embodiments of the invention, the jittering is performed at a rate greater than 10 times per second.

According to an aspect of some embodiments of the present invention there is provided apparatus for projecting a Computer Generated Hologram (CGH), including a computer controlled Spatial Light Modulator (SLM) for modulating coherent light and producing a CGH, an optical element for jittering a location of an exit pupil of the CGH.

According to some embodiments of the invention, the optical element is configured to project to a viewing angle larger than the exit pupil. According to some embodiments of the invention, the optical element includes a light deflector for jittering a direction of projection of the exit pupil.

According to some embodiments of the invention, the optical element is configured to jitter the location of the exit pupil of the CGH along a direction of a central ray of the projection.

According to some embodiments of the invention, the optical element is configured to jitter along the direction of a central ray of the projection.

According to some embodiments of the invention, the light deflector is a mirror.

According to some embodiments of the invention, the light deflector is located at a location of a real image of the GGH, and further including an optical system to re-image the real image from the location of the real image to another location.

According to some embodiments of the invention, the mirror is adapted to deflect light in one dimension. According to some embodiments of the invention, the mirror is adapted to deflect light in two dimensions.

According to some embodiments of the invention, the light deflector is a prism.

According to an aspect of some embodiments of the present invention there is provided apparatus for projecting a plurality of instances of a Computer Generated Hologram (CGH), including a computer controlled Spatial Light Modulator (SLM) for modulating coherent light and producing a CGH, and a beam splitter for splitting off a first instance of the CGH in a first direction and a second instance of the CGH in a second direction configured so that a first exit pupil of the first instance is close to a second exit pupil of the second instance and does not overlap the second exit pupil of the second instance.

According to some embodiments of the invention, if a first direction differs from the second direction by an angle smaller than a threshold angle, the same modulation of the light by the SLM is used to produce the same CGH in the first direction as in the second direction.

According to some embodiments of the invention, the threshold angle corresponds to an angle which produces a distance between the first exit pupil and the second exit pupil such that the distance is less than a size of an observer's input pupil, and the first exit pupil and the second exit pupil do not overlap.

According to an aspect of some embodiments of the present invention there is provided apparatus for projecting a plurality of instances of a Computer Generated Hologram (CGH), including a computer controlled Spatial Light Modulator (SLM) for modulating coherent light and producing a plurality of CGHs, each one of the plurality of the CGHs at a different portion of the SLM, and a beam splitter for splitting off a first CGH in a first direction and a second CGH in a second direction configured so that a first exit pupil of the first CGH is close to a second exit pupil of the second CGH and does not overlap the second exit pupil of the second CGH.

According to some embodiments of the invention, if a first direction differs from the second direction by an angle smaller than a threshold angle, the same modulation of the light by the SLM is used to produce the same CGH in the first direction as in the second direction.

According to some embodiments of the invention, the threshold angle corresponds to an angle which produces a distance between the first exit pupil and the second exit pupil such that the distance is less than a size of an observer's input pupil and the first exit pupil and the second exit pupil do not overlap.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof to using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6A is a simplified illustration of what happens to light shining through a rotating prism;

FIG. 6B is a simplified illustration of a prism being used to shift an observation window of a CGH according to an example embodiment of the invention;

DESCRIPTION OF SPECIFIC EMBODIMENTS OF THE INVENTION

Figure 1:
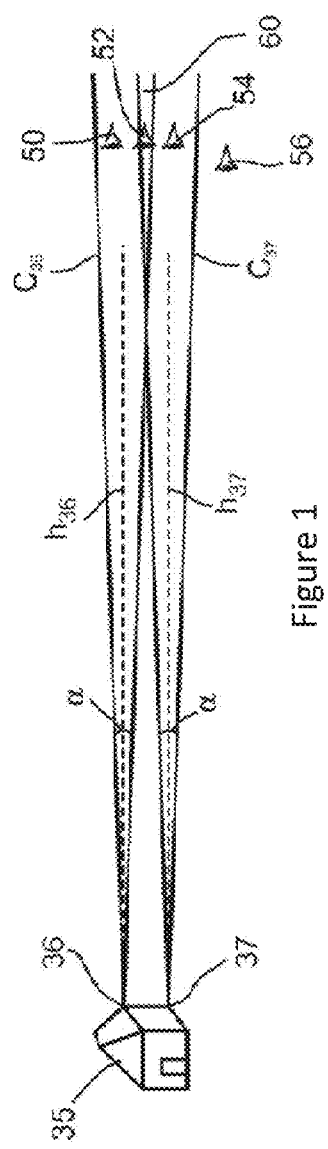
FIG. 1 is a simplified illustration of an eye viewing a hologram.

The present invention, in some embodiments thereof, relates to Computer Generated Holograms (CGHs) and, more particularly, but not exclusively, to methods and apparatus for increasing an observing window through which a CGH can be viewed.

The terms "CGH" and "hologram" are used throughout the present specification and claims to mean any type of computer generated hologram, including, by way of a non-limiting example, Fourier holograms and Fresnel holograms.

The present invention, in some embodiments thereof, is particularly useful for viewing CGHs which have an observation window which is small, such as is typically the case nowadays, with observation window size being more or less a square or rectangle having a 10 millimeter diagonal.

In some embodiments of the invention, an optical system projecting the CGH is used to jitter, or cyclically deflect, a direction of projection of the CGH, so as to cause the observation window to be seen from a broader area than a steady direction may be seen.

In some embodiments of the invention, an element in an optical system to projecting the CGH is used to jitter, or deflect, or shift, a direction of projection of the CGH, so as to cause the observation window to be seen from a broader area than a steady direction may be seen. Such embodiments are termed herein shifted observation window embodiments.

Various elements are used for causing the observation window to jitter.

In some embodiments of the invention, a mirror in the optical system vibrates, causing the observation window to jitter. The vibration may be in one angular dimension, stretching the observation window in one lateral direction relative to the optical axis, or the vibration may be in two angular dimensions, stretching the observation window in two lateral directions, and/or the vibration may be in a direction along the optical axis, stretching the observation window along the optical axis/viewing direction, also termed the Z axis.

Various methods are optionally used for causing a mirror to vibrate. The mirror may be mounted on an electrically controlled rotatable mount, which rotates the mirror about one dimension, or two mounts, in two directions. The mirror may be mounted with a hinge on one edge and an actuator on another edge. Movement of the mirror may a cyclical movement at a more or less fixed frequency, optionally a frequency determined by mechanical properties of the mirror element, and or determined by full electrical control of movement of the mirror.

In some embodiments of the invention, a prism in the optical path vibrates or rotates, causing an exit pupil of the optical system to jitter. If a rotating prism is used, the rotation may be at a fixed rate.

In some embodiments of the invention, the exit pupil is enlarged in a direction of the Z axis by moving an element other than the element which produces lateral jitter. In some embodiments, jittering along the Z axis is performed by moving a lens and/or a mirror and/or an optical slab back and forth along the Z axis.

In some embodiments of the invention an axis of symmetry of the real image of an object in the CGH, if such an axis exists, is projected to coincide with an axis of rotation of the mirror. In such an embodiment, the vibration of the mirror is not visible to a viewer. In such an embodiment image location as viewed by the viewer, relative to the world, optionally remains fixed.

In some embodiments of the invention a center of the real image of an object in the CGH is projected to coincide with an axis of rotation of the mirror. In such an embodiment, the vibration of the mirror is minimally viewable by a viewer, the image coordinates relative to the world seems to remain the same and the viewer typically accepts such vibration without noticing a decrease in image quality.

In some embodiments of the invention, the optical system projecting the CGH is used to produce several directions of projection of the CGH, so as to produce several observation windows adjacent to each other. In some embodiments of the invention adjacent observations windows are non-overlapping. In some embodiments of the invention when the adjacent observations windows are non-overlapping, the distance between the non-overlapping adjacent observations windows is projected to be less than an interpupillary distance at the location of a viewer.

In some embodiments of the invention the optical system splits a CGH into several directions using a beam splitter. Such embodiments are termed herein scattered observation window embodiments.

In some embodiments of the invention an SLM is apportioned into several portions, each of which produces an instance of a CGH, each instance directed to a different direction.

In some embodiments of the invention, the several instances of the CGH are directed to different directions using one or more optical elements, such as prisms or Fresnel lenses.

In some embodiments of the invention, the several instances of the CGH are directed to different directions based on a computer controlling the SLM to produce CGHs in the different directions. Optionally, the computer controls the SLM to produce a light field front corresponding to a scene which includes both the object of the CGH and an optical element for deflecting the observation window.

In some embodiments of the invention, the CGH is optionally of a shell of a three dimensional object, that is, an image of a surface of the object.

In some embodiments the shell is computed by the computer to be a shell to a vector, that is, a shell computed as if a viewer is far distant. When the CGH image is a shell of an object, and the image is vibrating, the image does not provide a viewer with depth cues in form of edges of the shell sometimes occluding other parts of the shell and to sometimes not. The viewer uses the larger observation window, without the viewer suffering from appearance and disappearance of depth cues caused by the vibration.

In some embodiments the shell is computed by the computer to be a shell to a specific point for one eye, and a shell to a different specific point for another eye.

In some embodiments the shell is computed by the computer to be a shell to a specific point, that is, a shell computed as if a viewer is at a specific point, a specific distance away from an object displayed in the CGH.

In some embodiments multiple shells are computed by the computer to be all shells to a specific point, that is, shells are computed as if a viewer is at a specific point, a specific distance away from an object displayed in the CGH. Optionally, some of the shells are transparent thus the viewer can see images within images or images beyond/ahead of other images.

In some embodiments a cloud of voxels is computed by the computer, each voxel contains a transparency attribute, that is, voxels to be projected are computed as if a viewer is at a specific point, a specific distance away from an object displayed in the CGH. Optionally, some of the voxels, per their transparency attribute, are presented in different planes allowing the user to view images within images or alternatively multiple layers as sees from a specific direction.

In some embodiments of the invention, when the angle between projection directions of the jittered observation window, or the several adjacent observation windows, is small, the same CGH is optionally presented to the viewer, without compensating for the small shift in viewing direction. A viewer gains the benefit of the larger observation window, without suffering from the image not appearing to jump when the viewer's head is slightly moved from one observation window to another.

In some embodiments of the invention, the adjacent observation windows display a real image of an object in the CGH at the same location.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a simplified illustration of an eye viewing a hologram. FIG. 1 illustrates some principles in viewing a hologram.

The hologram displays a real image 35 of an object (a house). Each point (for example, 36, 37) in the real image emits light in a direction of a central ray ($h_{36}$, $h_{37}$) and in a typically narrow angle (a) around the direction of the central ray, producing cones ($C_{36}$, $C_{37}$) around the directions of the central rays ($h_{36}$, $h_{37}$). A first point 36 is seen from every point within a first cone $C_{36}$, and a second point 37 is seen from every point within a second cone $C_{37}$. The cones $C_{36}$ and $C_{37}$ are referred herein as observation windows of the points 36 37.

The two points 36 and 37 can be seen simultaneously from every point which is part of both the first cone 36 and the second cone 37, form an observation window 60, from which both points 36 37 are viewable. Similarly, a space from which the entire hologram is viewable may be determined, and denoted as an observation window of the hologram.

In some embodiments, the observation window is an exit pupil of the optical system producing the hologram. When a computer controlled SLM is used to produce a computer generated hologram, the observation window of the hologram is typically the size of an image of the SLM as imaged through the optical system used to project the hologram.

FIG. 1 depicts a first eye 52, which overlaps with a portion of observation window 60 can see both points 36 and 37, a second eye 54 which can see point 37 but not 36, and a third eye 56 which cannot see any of points 36 and 37.

It is noted that FIG. 1 depicts a person's eye as an input pupil to a human observer. However, the observer may optionally be another optical system, and/or an electronic system viewing the CGH.

Figure 2:
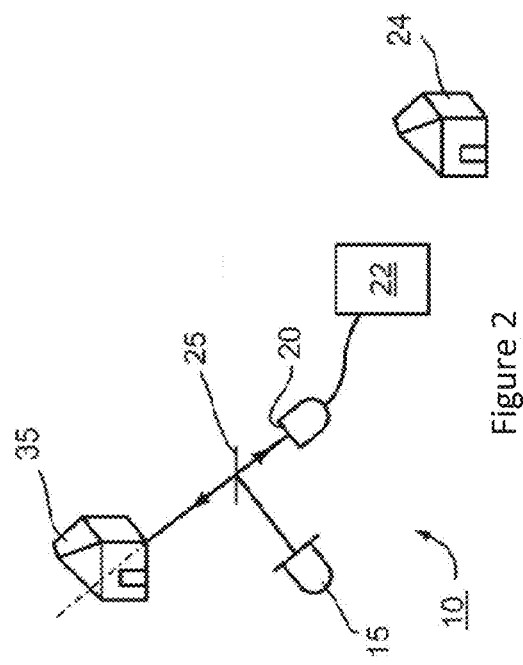
FIG. 2 is a simplified illustration of an example embodiment of a computerized hologram generation unit.

Reference is now made to FIG. 2, which is a simplified illustration of an example embodiment of a computerized hologram generation unit 10. The example hologram generation unit 10 includes a coherent light source 15, and a spatial light modulator (SLM) 20.

The SLM 20, which is depicted in FIG. 2 as a reflective SLM, may be a transmissive SLM in other embodiments, is connected to a computerized control unit 22, which controls the optical behavior of separate pixels of the SLM, so that light reflected off the SLM reproduces a light field front emanated from a scene. FIG. 2 depicts an example image 35 which depicts a house 24.

In the example embodiment of FIG. 2, light going from the light source 15 is deflected with a beam splitter 25, goes to the SLM 20, and is reflected from the SLM to create a holographic real image 35. The beam passes once again through the beam splitter 25.

In some embodiments of a computerized hologram generation unit, a transmissive SLM (not shown) may be used, and the light is optionally not reflected by a beam splitter.

It is noted that the computerized hologram generation unit depicted in FIG. 2 produces a real image 35 which is seen via a limited observation window as depicted in FIG. 1.

Example Embodiments of Shifting the Observation Window

Reference is now made again to FIG. 2. In some embodiments of the invention, the entire computerized hologram generation unit 10 projecting the CGH is vibrated, or jittered, so as to cyclically deflect a direction of projection of the real image 35, causing the observation window to be seen from a broader area than a steady direction may be seen.

Example Embodiments of Shifting the Observation Window Using a Mirror

Figure 3:
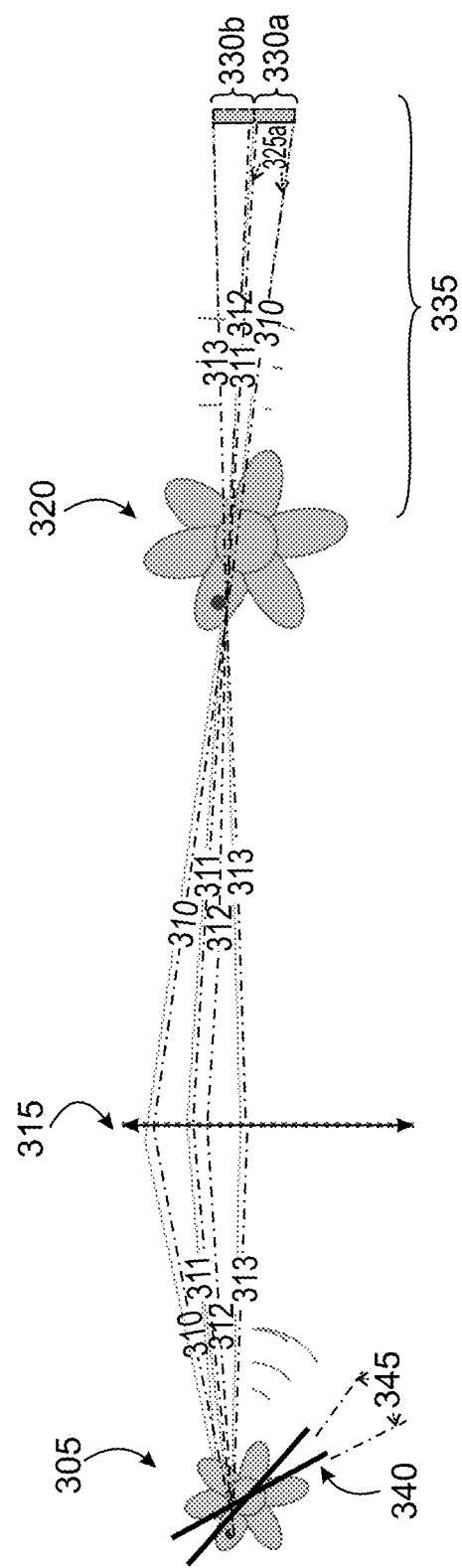
FIG. 3 is a simplified illustration of a real image and some elements of an optical system used to jitter a projection direction of a real image of a CGH, thereby enlarging an observation window of the CGH according to an example embodiment of the invention.

Reference is now made to FIG. 3, which is a simplified illustration of a real image and some elements of an optical system used to jitter a projection direction of a real image of a CGH, thereby enlarging an observation window of the CGH according to an example embodiment of the invention.

FIG. 3 depicts a first real image 305, a first ray 310 and a second ray 311 projected from a point in the real image 305, through an optical system 315, and reimaged at a point in a second real image 320.

The optical system 315 provides two functions: the optical system 315 reimages the first real image 305 to a wide viewing space; and the optical system 315 reimages the SLM which is used to produce the CGH, defining the observation window of the CGH.

Continuing the first ray 310 and the second ray 311 beyond the second real image 320 provides an indication of an angular extent 325a of an observation window 330a of the second real image 320 of the CGH. When the second real image 320 is viewed from a distance 335, the angular extent 325a of the observation window of the second real image 320 of the CGH defines a size of the observation window 330a.

It is noted that the optical system 315 may optionally magnify the first real image 305. This is useful for observing a CGH, since the first real image 305 may be small, and it may be desired that the second real image 320 be larger than the first real image 305 and viewable from a distance. In such a case the optical system 315 optionally has a large numerical aperture in viewing the first real image 305, while observing the second real image 320 is done via a small observation window, that is, the observing has a small numerical aperture. The size of the observation window is a size of an image of a source of the hologram, for example an image of an SLM.

Rotating the mirror 340 causes the observing window location to be swept across an observer's eye, while having little effect on image sharpness, producing an increase in the effective size of the observing window.

FIG. 3 also includes an optical element, for example a mirror 340, which rotates by an angle 345, used to shift the projection direction of the first ray 310 and the second ray 311 of the first real image 305, producing a third ray 312 and a fourth ray 313 thereby shifting the observation window 330a to a second position 330b, corresponding to the angle 345 which the mirror 340 rotated.

When the mirror 345 is rotated back and forth, the observation window 330 sweeps back and forth, enlarging the area from which the viewer can observe the CGH.

The mirror 340 is optionally placed more or less at a location of the first real image 305, so that rotation of the mirror 340 does not cause the first real image 305 to appear to shift laterally, only to rotate by the angle 345.

The observing window 330 is shifted by an angle which is equal to the angle 345 of rotation of the mirror 340, divided by the magnification of the optical system 315. The second real image 320 is viewed as relatively sharp because the rotating angle of the second real image 320 is relatively small and an axis of the rotation is at the location of the second real image 320.

The observation window 330 is an exit pupil of the optical system producing the hologram.

In some embodiments of the invention shifting the angle scans the observing window 330 across an observer's input pupil.

In some embodiments, the scanning is performed at a cinematic rate across the observer's input pupil. In some embodiments, the rate is greater than 10 times per second. In some embodiments, the rate is greater than 20 times per second, or 30 times per second.

In some embodiments, the jittering is performed at a rate which is based, at least partly, on a rate of refresh of a component producing the hologram. For example, if the CGH refresh rate is a cinematic rate, in some embodiments the jitter rate is optionally significantly higher than the cinematic rate.

In some embodiments, projecting light includes light from different light sources having different colors. In some embodiments, the scanning is performed at a rate multiplied by the number of different colors or light sources.

In some embodiments of the invention, the first real image 305 is optionally of a shell of a three dimensional object, that is, an image of a surface of the object. For example, the first real image is optionally of a surface of a flower as seen from the direction of the rays.

In some embodiments the shell is computed by the computer to be a shell as visible to a viewer who is far distant. For example, a shell computed to a direction midway between the first ray 310 and the second ray 311. Since the first real image 305 is a shell of an object, when the image 305 is rotated, the image 305 does not provide a viewer with depth cues in form of edges of the shell sometimes occluding other parts of the shell and sometimes not. The viewer uses the larger observation window, without the viewer suffering from appearance and disappearance of depth cues caused by the vibration.

In some embodiments the shell is computed by the computer to be a shell to a specific point, that is, a shell computed as if a viewer is at a specific point, a specific distance away from the first real image 305. For example, a distance is optionally chosen by taking the distance 335 from which a viewer views the second real image 320, and modifying the distance 335 by reversing effects of the optical system 315 to produce a second distance (not shown) from the first real image 305.

A more detailed description of an example embodiment of the invention is now provided. The example embodiment of the invention described herein is embedded in an example embodiment of a system for broad viewing angle displays and user interfaces as described in above-mentioned PCT published patent application WO 2010/004563 by Rotschild et al.

Figure 4A:
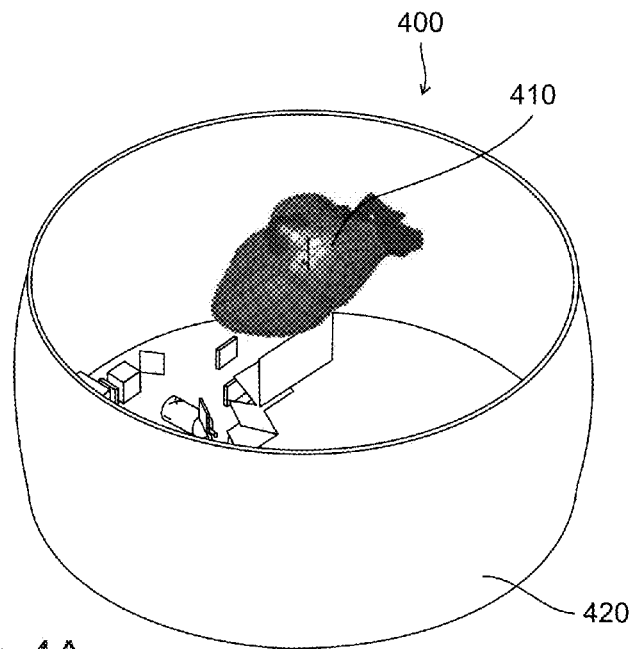
FIG. 4A is a simplified pictorial illustration of an example 360° walk-around image projection system according to an embodiment of the invention.

Reference is now made to FIG. 4A, which is a simplified pictorial illustration of an example 360° walk-around image projection system according to an embodiment of the invention.

FIG. 4A depicts a system 400 showing an image 410 of a heart shown floating in the air. FIG. 4A depicts an eyepiece 420, which optionally has an inner reflective surface shaped as a paraboloid of rotation. Optionally, a vertical cross-section in the eyepiece 420 has a shape of a parabola, and a horizontal cross-section has a shape of a circle.

The eyepiece 420 functionally corresponds to the optical system 315 of FIG. 3, re-imaging a first real image of a CGH (not shown in FIG. 4A) to a second real image of the CGH, which is the image 410.

Figure 4B:
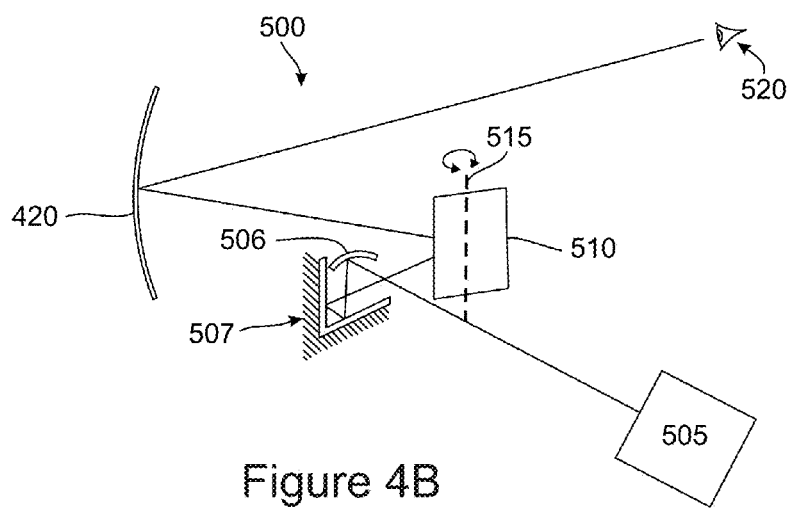
FIG. 4B is an additional simplified illustration of the system of FIG. 4A.

Reference is now also made to FIG. 4B, which is an additional simplified illustration of the system of FIG. 4A.

FIG. 4B depicts a sub-system 500 of the system 400 of FIG. 4A. A few details of the sub-system 500 are depicted in FIG. 4B: an SLM 505; a curved mirror 506 acting as an objective to the eyepiece 420 of FIG. 4A, also depicted in FIG. 4B, used for redirecting rays from the SLM 505; a V-shaped mirror 507 having two mirror surfaces used for redirecting rays from the curved mirror 506; a rotatable mirror 510 which can rotate or revolve around its axis 515, used for redirecting rays from the V-shaped mirror 507; and the eyepiece 420 also depicted in FIG. 4A, used for redirecting rays from the rotatable mirror 510 to a viewer's eye 520.

When the mirror 510 rotates back and forth, for example, by some specific angle, the mirror 510 shifts an observation window (not shown) across the viewer's eye.

In some embodiments of the invention the rotation of the mirror 510 is computer controlled.

In some embodiments of the invention, the viewer's eye 520 is tracked by an eye-tracking sub-system (not shown), and the exit pupil (not shown) is swept across the viewer's eye 520.

In some embodiments of the invention, the viewer's eye 520 is tracked by an eye-tracking sub-system (not shown), and a distance of an exit pupil is shifted so as to track the distance of the viewer's eye 520 from the optical system. Had the exit pupil not been tracking the distance of the viewer's eye 520, the viewer might potentially suffer from viewing through a smaller exit pupil when nearing or distancing from the optical system. By tracking the distance of the viewer's eye 520 from the optical system and shifting the distance of the exit pupil correspondingly, the viewer's eye 520 can potentially enjoy an optimum sized exit pupil.

In some embodiments, tracking the distance of the viewer's eye 520 from the optical system is performed, by way of a non-limiting example, by triangulation, using several imaging devices, as is known in the art.

In some embodiments, shifting an exit pupil along a Z axis (direction of the viewer's eye 520) is optionally performed by moving a lens and/or a mirror and/or an optical slab back and forth along the Z axis.

One example embodiment which enables shifting an exit pupil along the Z axis is depicted in FIG. 4B. Moving the V-shaped mirror 507 back and forth in the direction of the apex of the V-shaped mirror 507 changes the distance between the eyepiece 420 and the SLM image. Thus, moving the V-shaped mirror 507 allows for following eyes of a viewer who moves away from the hologram or comes near the hologram along the Z axis.

In some embodiments, an image of a CGH is produced by a laser pulse impinging upon the SLM 505. In such embodiments, when the mirror 510 shifts, the duration of the laser pulse is optionally lengthened, so that the image of the CGH is visible during the shift.

FIG. 4B depicts the mirror 510 as rotatable around the axis 515. In some embodiments of the invention the mirror 510 is rotatable around the axis 515, and also around a second axis (not shown), perpendicular to the first axis 515.

In some embodiments of the invention, the mirror 510 is placed at a symmetry location relative to the optical system which is used to project the image of the CGH. When the mirror 510 rotates, the optical paths of rays which project the image of the CGH do not change length, only direction.

In some embodiments of the invention, the optical system is designed to produce the holographic image at a symmetry location relative to the optical system symmetry. When the mirror 510 rotates, the optical paths of rays which project the image of the CGH do not change length, only direction. The image coordinates remain substantially the same.

In some embodiments of the invention, instances of the CGH are optionally produced so that when the mirror 510 rotates, the images of the CGH counteract the rotation, and the image optionally appears to be stationary.

In some embodiments of the invention, when the mirror 510 is jittered, or rotated, by a small angle, the image of the CGH appears to be static, while the speckles on the images move out of the observation window of the CGH.

Figure 6C:
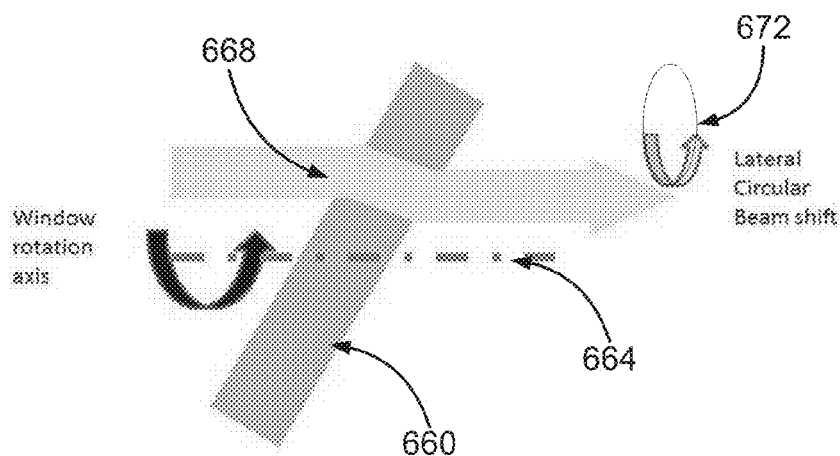
FIG. 6C is a simplified illustration of what happens to light shining through a tilted window.
Figure 6D:
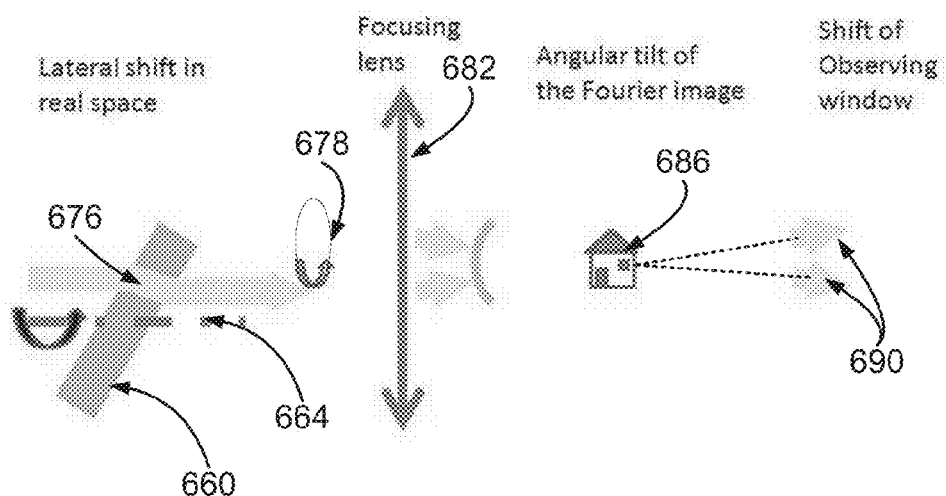
FIG. 6D is a simplified illustration of a tilted window being used to shift an observation window of a CGH according to an example embodiment of the invention.

In some embodiments of the invention, a tilted optical window (not shown) in the optical path vibrates or rotates, causing the observation window to jitter. The tilted optical window is tilted with respect to the optical axis of the optical system. If a rotating tilted optical window is used for causing the jitter, the rotation may optionally be at a fixed rate. FIGS. 6C and 6D and their description below further describe using a tilted window.

Figure 5:
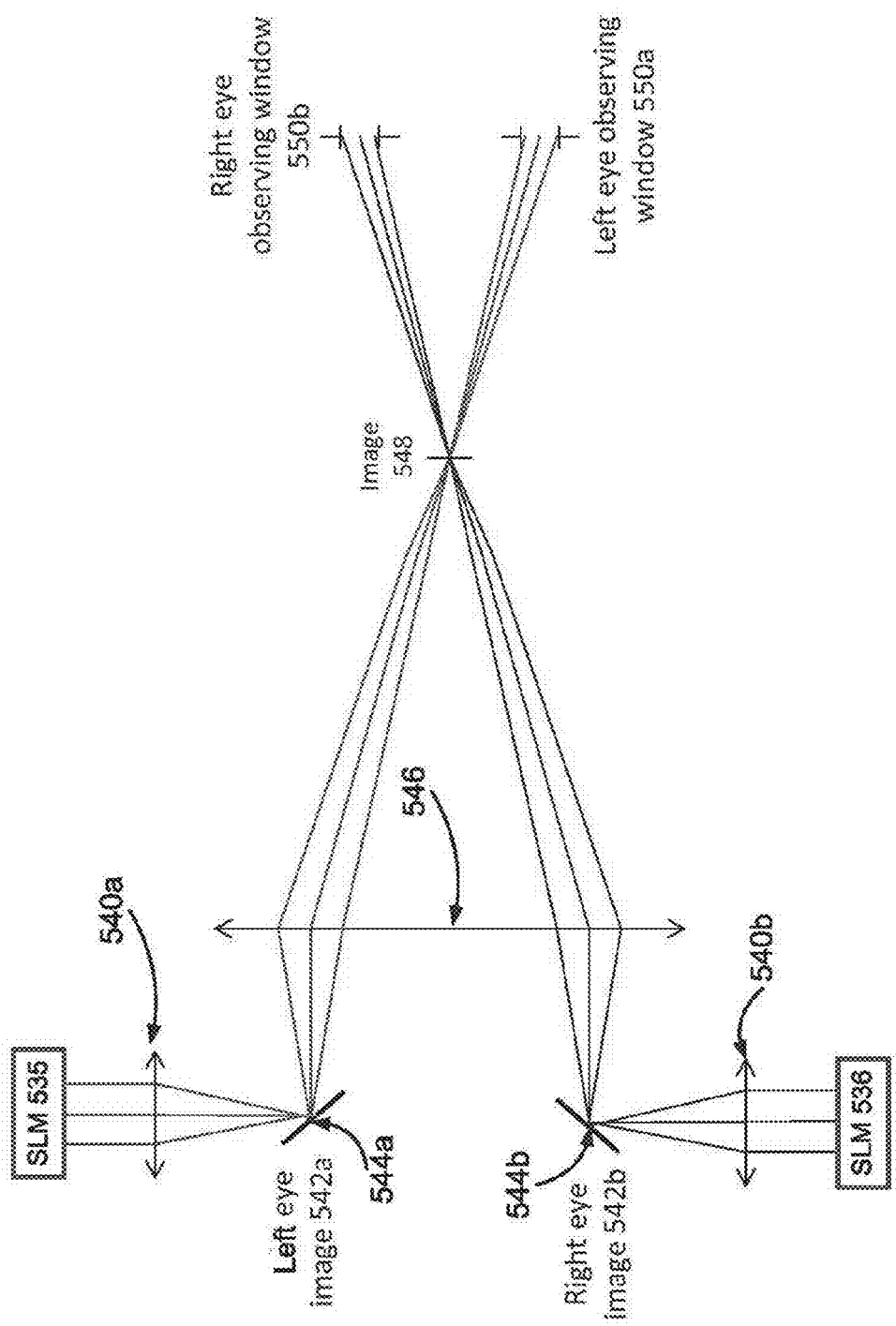
FIG. 5 is a simplified pictorial illustration of an example CGH projection system constructed according to an embodiment of the invention.

Reference is now made to FIG. 5, which is a simplified pictorial illustration of an example CGH projection system constructed according to an embodiment of the invention.

The example CGH projection system includes two SLMs 535 536, projecting images 542a 542b via optical components 540a 540b.

The images 542a 542b are reimaged via an optical system 546 to a location 548 of a second image.

FIG. 5 depicts the images 542a 542b optionally both reimaged at a same location 548, although other example embodiments may not reimage at a same location.

The example CGH projection system of FIG. 5 produce two observing windows 550a and 550b, optionally projected to a right eye (not shown) and a left eye (not shown).

Deflection mirrors 544a and 544b are optionally located at locations of the images 542a 542b. The deflection mirrors 544a and 544b are optionally jittered, optionally causing a direction of projection of the second image toward the right and left eyes to jitter.

The optional jittering optionally enlarges the observing windows 550a 550b.

In some embodiments, the first image 542a, which is reimaged to the left eye, is of the same scene as the first image 542B which is reimaged to the right eye.

In some embodiments the second image produced by reimaging the first images 542a 542b appear to an observer as being both in the same physical location, and both oriented in the same spatial orientation.

In some embodiments, the first image 542a, which is reimaged to the left eye, is of a different scene than the first image 542B which is reimaged to the right eye.

Example Embodiments of Shifting the Observation Window Using a Prism

In some embodiments of the invention, shifting an observation window is performed by a prism or an optical wedge.

Reference is now made to FIG. 6A, which is a simplified illustration of what happens to light shining through a rotating prism.

FIG. 6A depicts a prism 610, having an axis of rotation 620.

FIG. 6A also depicts a beam of light 605 input into the prism 610. Optionally, the light 605 initially travels in a direction parallel to the axis of rotation 620. The light 605 passes into the prism 610 through a first face 611 of the prism 610 and out through a second face 612 of the prism 610. Due to an angle 615 between the first face 611 and the second face 612, direction of outgoing light 613 is shifted from its initial direction.

As the prism 610 rotates around its axis 620, the second face presents a different angle to the incoming light 605 (not shown), and the light is shifted to a different direction (not shown).

A rotating prism introduced into a path of light can shift the direction of the light according to the angle 615 between the faces of the prism 610 and the difference in index of refraction between the material of the prism 610 and the surrounding medium.

Reference is now made to FIG. 6B, which is a simplified illustration of a prism being used to shift an observation window of a CGH according to an example embodiment of the invention.

FIG. 6B depicts the rotating prism 610 of FIG. 6A, having an axis of rotation 620, inserted into an optical path of light 605 projected from a first real image 606, similar to the first real image 305 of FIG. 3. The rotating prism 610 causes the light direction from the first real image 606 to shift direction to a different direction 613. The light goes through a second imaging system 630, and a second real image 640 is formed. Because of the rotating prism 610, the second real image 640 is projected from different directions corresponding to the rotation of the prism 610, causing a corresponding shift in an observation window 650 of the second real image 640. The observation window 650 sweeps an area larger than one static observation window, as depicted by two instances of the observation window, 650a and 650b, out of many possible observation windows in the sweep to the observation window 650 caused by the rotating prism 610.

When the rotating prism 610 is placed in the image plane of a first real image 606, as depicted in FIG. 6B, the second real image 640 does not noticeably shift laterally. The deflection of diffraction angles shifts the observing window 650 in two transverse dimensions.

Reference is now made to FIG. 6C, which is a simplified illustration of what happens to light shining through a tilted window 660.

FIG. 6C depicts a tilted window 660, having an axis of rotation 664. The window is termed tilted because the window is tilted relative to a direction in which an example beam of light 668 impinges upon the window 660.

FIG. 6C depicts the beam of light 668 input into the tilted window 660. Optionally, the beam of light 668 initially travels in a direction parallel to the axis of rotation 664. The beam of light 668 passes into the tilted window 660 through a first face of the tilted window 660 and out through a second face of the tilted window 660.

Due to an angle between the first face of the tilted window 660 and the beam of light 668, a direction of the beam of light 668 is shifted from its initial direction when to the beam of light 668 enters the tilted window 660. As the beam of light exits from the tilted window 668 through the second face of the tilted window 660, the direction of the beam of light 668 is shifted in the opposite direction from the shift upon entering. However, a result of passing the two faces of the tilted window is a lateral shift for the beam of light 668.

As the tilted window 660 rotates around its axis 664, the beam of light 668 is shifted laterally, and a point in the beam of light 668 describes a circular path 672.

Reference is now made to FIG. 6D, which is a simplified illustration of a tilted window 660 being used to shift an observation window of a CGH according to an example embodiment of the invention.

FIG. 6D depicts the tilted window 660 of FIG. 6C, having an axis of rotation 664, inserted into an optical path of light 676 projected from an SLM (not shown). The rotating tilted window 660 causes the light direction from the SLM to shift laterally, as depicted by a circular path 678. The light goes through an imaging system, depicted by an example focusing lens 682, and an image 686 is formed. Because of the rotating tilted window 660, which causes the lateral shift, the image 686 is projected onward in different directions 690 corresponding to the rotation of the tilted window 660 and the lateral shift caused by the rotation, causing a corresponding shift in an observation window (not shown) of the second real image 686.

Figure 6E:
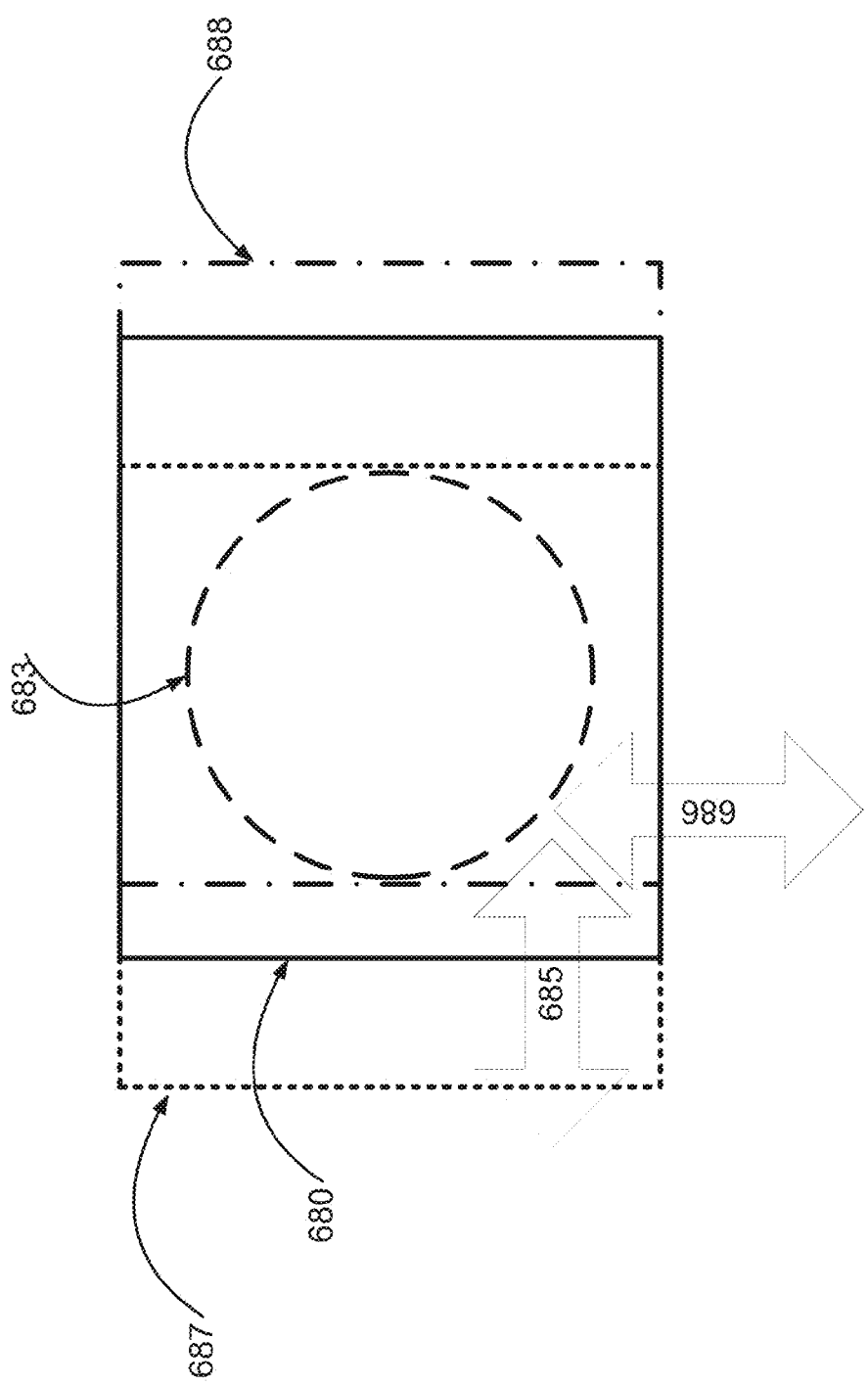
FIG. 6E is a simplified illustration of an observation window of a CGH produced according to an example embodiment of the invention, as seen from a viewer's point of view.

Reference is now made to FIG. 6E, which is a simplified illustration of an observation window 680 of a CGH produced according to an example embodiment of the invention, as seen from a viewer's point of view.

FIG. 6E depicts a qualitative representation of a rectangular observation window 680 of a CGH, on which is also depicted a viewer's pupil 683 (which can be an input pupil of an optical system).

In some embodiments an observation space has a cone shape before and after the observation window.

FIG. 6E maintains a qualitative proportion between sizes of the observation window 680 and the pupil 683.

Arrows 685 and 686 depict the possibility of the observation window 680 moving in two perpendicular directions in order to effect a two dimensional sweep of the observation window 680. It is noted that any sweep of the window may be effected, such as a one-dimensional sweep in one direction, or a circular sweep, a random sweep, or even a random jump from location to location.

FIG. 6E depicts the observation window 680 overlapping the pupil 683. When the observation window 680 is jittered, or swept, or moved, across the pupil 683, as long as the pupil 683 remains inside the observation window 680, a viewer sees the CGH.

In some embodiments, a range of moving the observation window 680 relative to the pupil 683 is such that the pupil 683 is always entirely inside the observation window 680. For example, an observation window 687 depicts a maximal left shift of the observation window 680 in such an embodiment, and an observation window 688 depicts a maximal right shift of the observation window 680 in such an embodiment.

In some embodiments, a range of moving the observation window 680 is such that a first observation window 680 always has some overlap with a second, shifted observation window 680. In such embodiments, if the movement of the observation window 680 is along one direction, an area covered by the observation window 680 is doubled. In such embodiments, if the movement of the observation window 680 is along two perpendicular directions, an area covered by the observation window 680 is quadrupled. In such embodiments, a solid viewing angle covered by the observation window 680 is quadrupled.

In some embodiments, the pupil 683 is entirely inside the observation window thus the viewer sees the CGH from no matter where the pupil is as long as it is within the widened observation window.

In some embodiments, the pupil 683 is partially inside the observation window, yet the viewer sees the CGH as long as the pupil 683 is even partially within the enlarged observation window. When the pupil 683 is within the enlarged observation window the viewer might see some degradation in brightness of the CGH.

Enlarging Observation Windows Potentially Helps to Produce Color CGHs

Figure 6F:
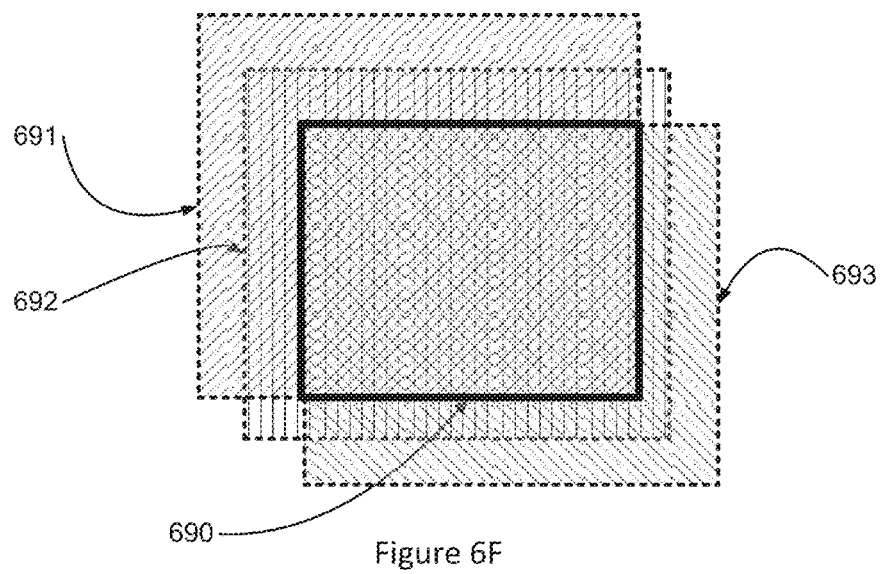
FIG. 6F is a simplified illustration of three example observation windows, corresponding to three colors which together produce a color CGH.

Reference is now made to FIG. 6F, which is a simplified illustration of three example observation windows 691 692 693, corresponding to three colors which together produce a color CGH.

FIG. 6F depicts, by way of a non-limiting example, a first observation window 691 of a CGH produced using a red wavelength; a second observation window 692 of a CGH produced using a green wavelength; and a third observation window 693 of a CGH produced using a blue wavelength.

An observation window for a color CGH is, by way of a non-limiting example, rectangle 690, which is an area in which all the three color observation windows 691 692 693 overlap. Areas which are not in the overlapping rectangle 690 will not display a color CGH using all three colors.

It is noted that it is quite possible that in some three-color systems, the three color observation windows do not overlap at all, prior to the observation windows being enlarged.

As described above, a CGH observation window, such as the three observation windows 691 692 693, which has not been enlarged is rather small. When an attempt is made to produce a color CGH by using three beams of three colors, any misalignment between the three observation windows 691 692 693 of the three color CGHs, shrinks the overlap rectangle 690, which is an observation window for a three color CGH. So the observation window for the three color CGH may well be even smaller than an observation window of a one color CGH.

Figure 6G:
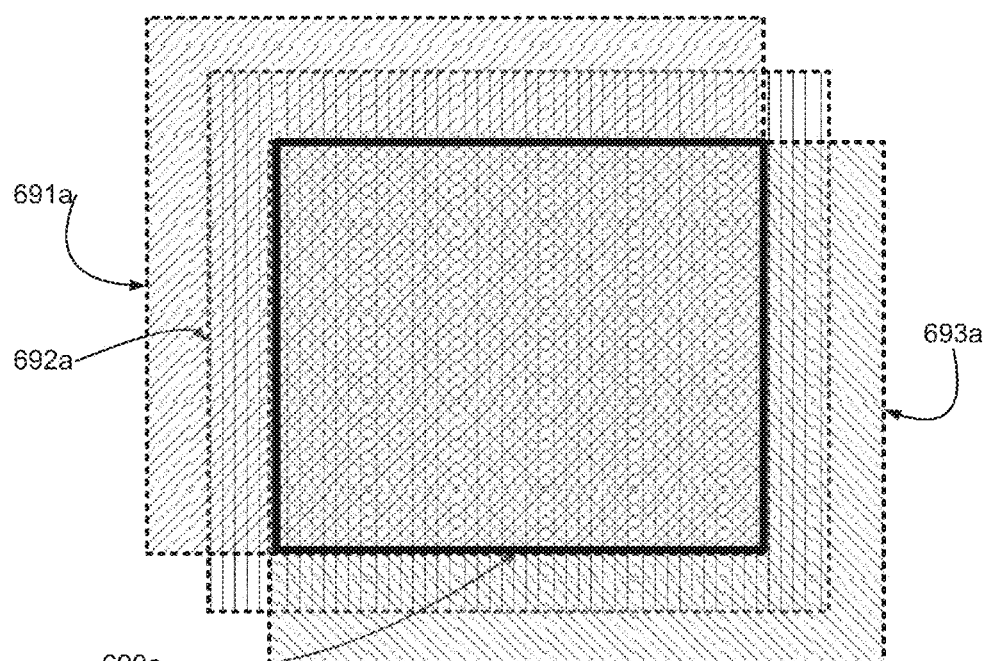
FIG. 6G is a simplified illustration of three example enlarged observation windows, produced according to an example embodiment of the invention, corresponding to three colors which together produce a color CGH.

Reference is now made to FIG. 6G, which is a simplified illustration of three example enlarged observation windows 691a 692a 693a, produced according to an example embodiment of the invention, corresponding to three colors which together produce a color CGH.

FIG. 6G depicts, by way of a non-limiting example, a first observation window 691a of a CGH produced using a red wavelength; a second observation window 692a of a CGH produced using a green wavelength; and a third observation window 693a of a CGH produced using a blue wavelength.

FIG. 6G is drawn to qualitatively a same scale as FIG. 6F. The observation windows 691a 692a 693a are slightly less than double the size of the three observation windows 691 692 693 of FIG. 6G, which is a conservative enlargement, since examples described herein teach how to enlarge an observation window by several-fold at least.

FIG. 6G also depicts an observation window for a color CGH being, by way of a non-limiting example, rectangle 690a.

Since a typical non-enlarged observation window is small, for example having a 10 millimeters diagonal, after misalignment an overlap area of three observation windows is even smaller. Enlarging the observation windows and enlarging the overlap area potentially provides a large improvement in viewing a color CGH.

Figure 6H:
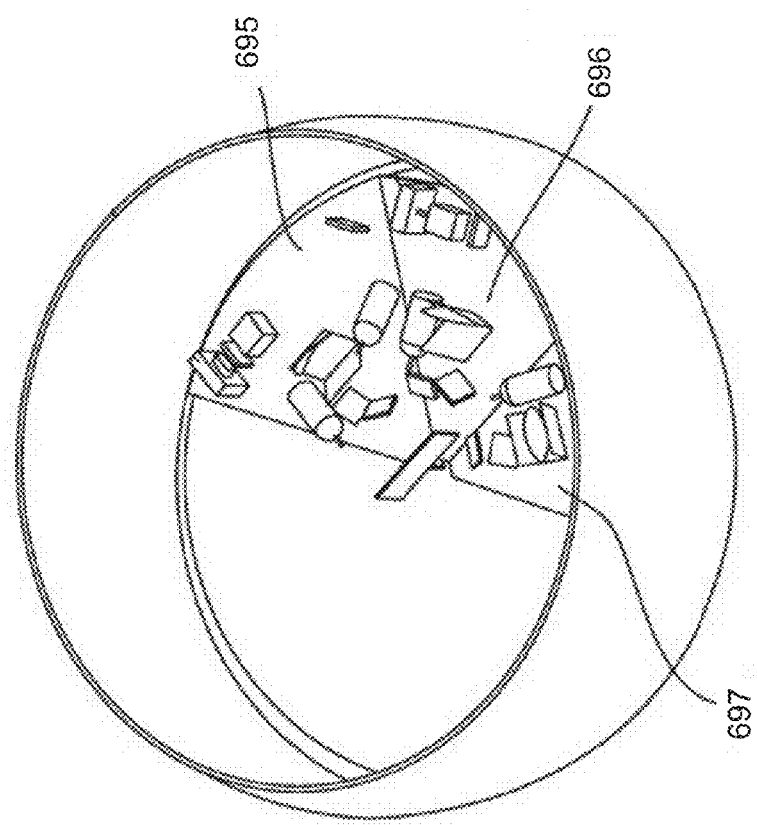
FIG. 6H is a simplified illustration of a three color CGH production system according to an embodiment of the invention.

Reference is now made to FIG. 6H, which is a simplified illustration of a three color CGH production system according to an embodiment of the invention.

FIG. 6H is similar to the system depicted in FIGS. 4A and 4B.

FIG. 6H depicts three units 695 696 697 for producing CGHs, using three colors and three SLMs in a projection system which optionally merges the three CGHs into an observation window. As described above, aligning the optical systems producing the three CGHs may produce a small observation window, even smaller than an observation window of a single optical system producing a single CGH.

The system of FIG. 6H potentially benefits greatly from enlarging the observation windows of each separate color, and producing a larger observation window for a combined three color CGH.

In some embodiments, a vibrating mirror, or a rotating optical wedge, or some other method of enlarging an observation window as described herein, is put into the optical path in each one of the three units 695 696 697, in order to enlarge their observation windows, and an observation window where the three colors overlap.

It is noted that using the three units 695 696 697 is optionally not necessarily for three colors, and yet may still potentially benefit from producing a larger overlap of the three observation windows.

Enlarging Observation Windows Potentially Loosens Optical Design Constraints and/or Simplifies Optical Design Enlarging observation windows potentially loosens optical design constraints. Optical systems often have misalignment between different observing windows (exit pupils) for, by way of a non-limiting example, different colors and/or observation to direction. Having different observation windows may require costly design to overcome the misalignment. Jittering and enlarging the misaligned observing widows can potentially replace a need for misalignment correction within the optical system, thus potentially reducing system development cost, and/or system development time, and/or reducing complexity and/or number of optical components, while potentially enhancing performance.

Systems for producing CGHs often suffer from a small observation window and/or exit pupil. Enlarging the observation window and/or exit pupil is usually desired, and an effort is made to achieve the enlargement by using optical design principles.

Embodiments of the invention produce enlarged observation windows/optical system exit pupils, potentially enabling a loosening of optical design constraints while maintain a desired size of the observation window/exit pupil.

In some embodiments, a potential benefit of relaxed optical design constraints is found.

Example Embodiments of Scattered Observation Windows

In some embodiments of the invention, producing scattered observation windows is performed by beam splitters.

Figure 7:
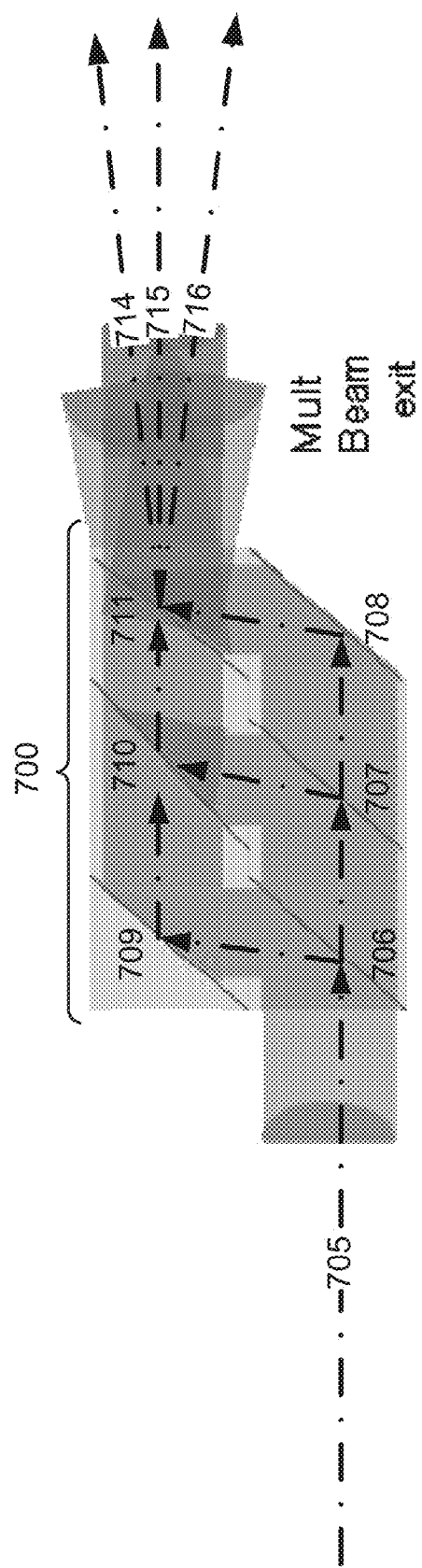
FIG. 7 is a simplified illustration of splitting an input beam into several different directions according to an example embodiment of the invention.

Reference is now made to FIG. 7, which is a simplified illustration of splitting an input beam 705 into several different directions 714 715 716 according to an example embodiment of the invention.

FIG. 7 depicts a setup 700 of beam splitters 706 707 710 711 and mirrors 708 709, configured so as to split an input beam 705 into an example three different output beams 714 715 716 in three different directions.

The setup 700 of the beam splitters 706 707 710 711 and the mirrors 708 709 not only splits the input beam 705, but also optionally imparts diverging directions for the output beams 714 715 716.

In some embodiments of the invention, the output beams all have equal intensity. Having equal intensity is optionally desirable so that a viewer sees a CGH via different scattered observation windows at equal intensity.

In some embodiments, a distance of a first observing window of a first output beam from a second observing window of a second output beam is less than a size of an observer's input pupil.

In some embodiments, the first observing window of the first output beam adjoins the second observing window of the second output beam.

An engineering tradeoff is manifested in the above example embodiment. Splitting the input beam provides scattered observation windows, which increases the area from which a hologram can be seen, and may decrease brightness of the hologram.

Figure 8:
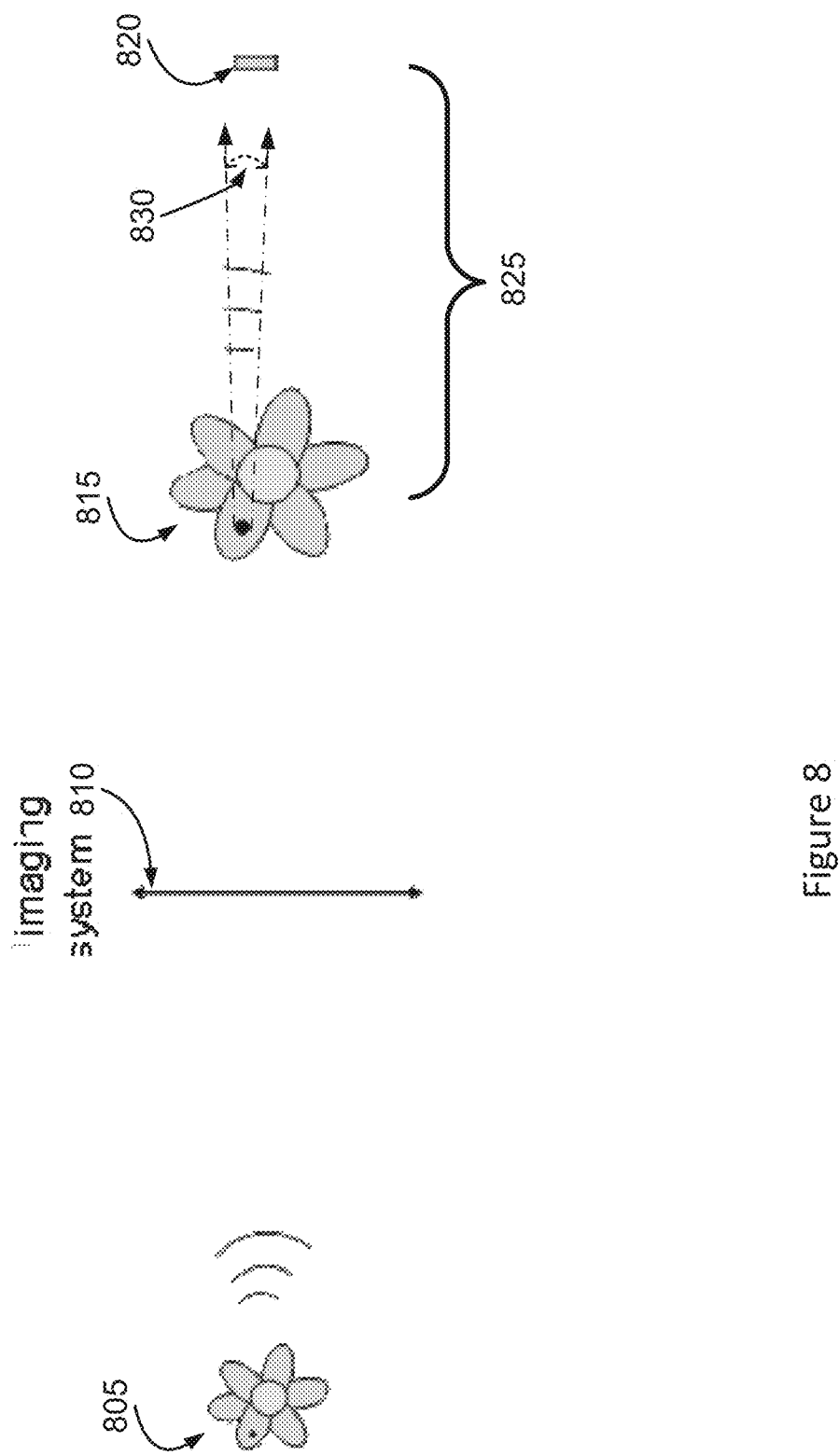
FIG. 8 is a simplified illustration of a reimaging system reimaging a first real image of a CGH as a second, magnified real image of the CGH, according to an example embodiment of the invention.

Reference is now made to FIG. 8, which is a simplified illustration of a reimaging system reimaging a first real image of a CGH as a second, magnified real image of the CGH, according to an example embodiment of the invention.

FIG. 8 depicts a first real image 805, reimaged by an imaging system 810 onto a second real image 815. The imaging system optionally magnifies the first real image 805, for example, by a factor of 10, although various magnifications in a range of 1-20 are contemplated. A size of an observing window 820 is computed by multiplying a sine of a diffraction angle of an SLM (e.g. ref. 20 of FIG. 2) by an observing distance 825, divided by the magnification (e.g. 8 or 10).

A sine of a diffraction angle of the SLM is equal to 2λ/(2*pixel size), where λ is a wavelength of light used for producing a CGH, typically measured in several hundreds of nanometers, and pixel size is a length or breadth of a pixel, they are typically square, measured in microns.

The observing window of the example embodiment of FIG. 8 is about 2 millimeters on a side, opening an angle 830 from a point on the second real object 815 to edges of the observing window 820.

An example embodiment of a system as described in FIG. 8 optionally uses an SLM (e.g. ref. 20 in FIG. 2) sized approximately 10 millimeters on a side, although other sized SLMs may be used. The SLM optionally produces a Fresnel hologram, of a size equal to the SLM, for example 10 millimeters on a side. A first real image 805 is optionally sized about 10 millimeters on a side.

A size of an observing window 820 in such an example case is computed to be to about 2 millimeters resulting from multiplying a sine of diffraction angle of the imaging system 810 (for example λ=0.5 microns, and the size of the SLM pixel is 20 microns, so the sine of the diffraction angle is 0.5/(2*20)≈0.0125, which corresponds to a diffraction angle of about 0.7 degrees), by an observing distance 825 (for example 100 centimeters, so 0.0125*100=1.25 centimeters, although an observing distance range of 5-150 centimeters is contemplated), divided by the magnification (for example 8, so 1.25/8≈0.19 centimeters, or about 2 millimeters, although a magnification range of 1-20 is contemplated).

In another example embodiment a size of an observing window 820 is approximately 8 millimeters on a side, and scans an area approximately 30 millimeters on a side, increasing the size of the observing window to 30 millimeters on a side.

In another example embodiment a size of an observing window 820 is approximately 8×5 millimeters, and scans an area approximately 35×5 millimeters, increasing the size of the observing window to approximately 30×5 millimeters.

In an example embodiment a maximum size of a first real image is about 100 millimeter in diameter.

In an example embodiment a distance of an exit pupil to a center of the second real image of the CGH image center is 500 millimeters.

In some embodiments the scanning is of an area approximately twice the length and twice the width of the observation window 820, so that at no time is the observer's pupil outside the observation window 820.

In some embodiments the observer's pupil is tracked by a tracking system, such as an eye tracking system. In such embodiments the observation window 820 is shifted to track the observer's pupil, and optionally in addition, the observation window 820 scans across the observer's pupil.

In some embodiments, the scanning across the observer's pupil, or jittering, is optionally performed at a frequency unrelated to the eye tracking, which may be static when the eye is static. In such embodiments the enlargement of the observation window by jittering provides a potential advantage—that eye tracking is allowed to temporarily lag behind the eye movement, and/or requires less accuracy from a viewer tracking system, since the observation window 820 is enlarged.

In some embodiments the scanning is optionally performed so as to be coordinated with eye tracking.

In some embodiments, the scanning proceeds further in a direction in which the eye tracking determines that the eye is moving than in the opposite direction.

In some embodiments, the scanning proceeds further, in a direction in which the eye tracking determines that the eye is moving, than in the opposite direction so as the eye moves the CGH is to be projected centered relative to the input pupil a frame or two or ten after an initial location.

Figure 9:
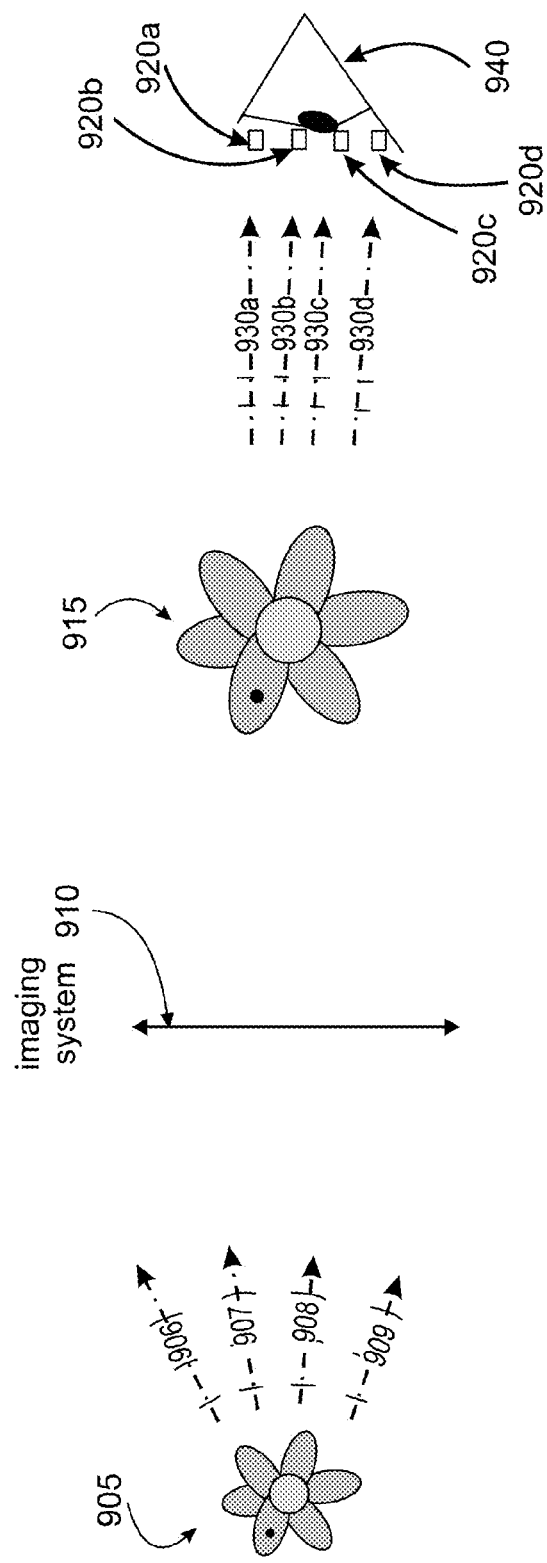
FIG. 9 is a simplified illustration of a real image of a CGH producing scattered observation windows and an optical system used to reimage the scattered observation windows according to an example embodiment of the invention.

Reference is now made to FIG. 9, which is a simplified illustration of a real image 905 of a CGH producing scattered observation windows and an optical system 910 used to reimage the scattered observation windows according to an example embodiment of the invention.

Light from the first real image 905 is optionally split into different directions 906 907 908 909 so as to produce scattered observation windows, optionally using a system such as described above with reference to FIG. 7, or as described below with reference to FIG. 10A or 10B, or by other devices for produce scattered observation windows.

The optical system 910 reimages the first real image 905 onto a second real image 915. The different directions 906 907 908 909 are also reimaged as different directions 930a 930b 930c 930d which produce scattered observation windows 920a 920b 920c 920d correspondingly.

An observer's eye 940 is depicted in FIG. 9, intended to show a simplified illustration of a good arrangement of the scattered windows 920a 920b 920c 920d, which are optionally spaced apart from each other so that the observer's pupil will view at least one of the scattered observation windows

920a 920b 920c 920d at any one time. A space between the scattered windows is optionally kept smaller than an observer's pupil.

In some embodiments of the invention, producing scattered observation windows is performed by apportioning a surface of the SLM used to produce the CGH so as to produce several different CGH, and project the several different CGHs in different directions, producing scattered observation windows.

A practical example embodiment of the invention is now described, using present day components. An SLM of 1024× 1024 pixels is used to generate an image of 500×500 pixels, although the maximum resolution can be 1024×1024 distinct pixels.

In some embodiments of the invention a different use is found for the excess resolution.

In some embodiments, an SLM of 4000×2000 pixels is used to generate images of 500×500 pixels.

A portion of 500×500 pixels of the SLM is used to produce a 500×500 point CGH. Using such portions, there is room for several different holograms, by way of some non-limiting examples 2 different holograms, 4 different holograms, and 32 different holograms.

Each of the different holograms is projected to a separate observation window, producing an array of 8 different scattered observation windows.

In some embodiments of the invention an array of prisms deflects a laser beam or beams which shine upon the SLM in different directions, producing the scattered observation windows.

In some embodiments of the invention the above mentioned array of prisms is a 2D array.

Figure 10A:
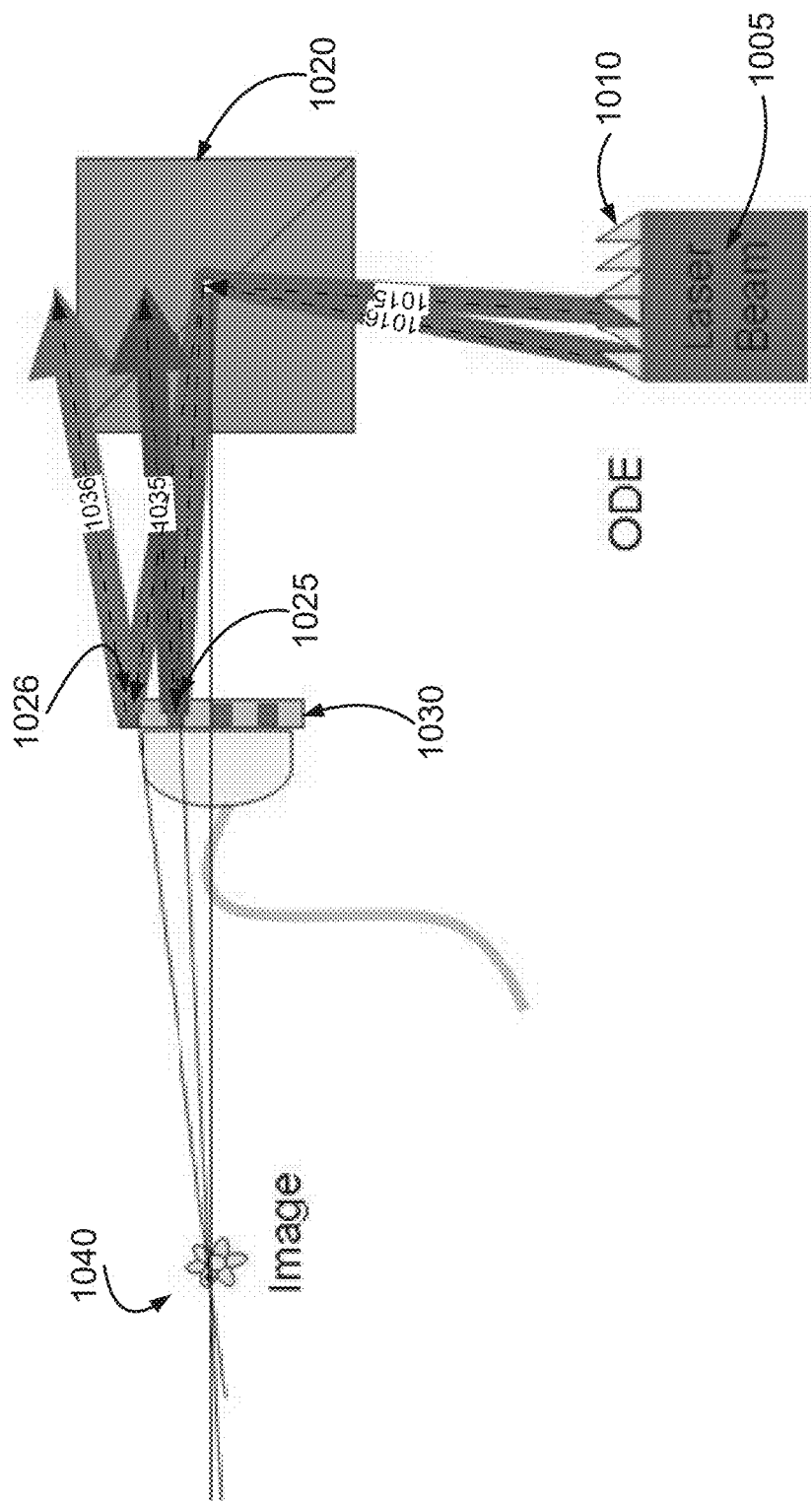
FIG. 10A is a simplified example embodiment of the invention used to produce scattered observation windows.

Reference is now made to FIG. 10A, which is a simplified example embodiment of the invention used to produce scattered observation windows.

FIG. 10A depicts a diffractive optical element (DOE) 1010, used to deflects portions of a laser beam 1005 in different directions, for a example a first direction 1015 and a second direction 1016.

The laser light deflected in the two directions 1015 1016 optionally passes through a beam splitter 1020 used to deflect beams in the different directions 1015 1016 from the DOE 1010 onto different portions 1025 1026 of a computer controlled SLM 1030. Each of the different beams is diffracted of the different portions 1025 1026 of the SLM 1030 in different directions 1035 1036.

The portions of the SLM 1030 are controlled so that the different beams projected in the different directions 1035 1036 produce an image 1040 of a same object at a same location and positioned in a same direction.

The image 1040 portrayed in FIG. 10A is an imaginary image. Different embodiments of the invention, using similar principles of producing scattered observation windows, produce a real image, or a Fresnel image, or a Fourier image.

The scattered observation windows (not shown) thus produced each contribute to an image of a same object, yet are scattered, so as to be viewed from a broader angle than possible is the observation windows were not scattered.

In some embodiments of the invention a suitable DOE is placed next to the SLM 1030, and the beam splitter 1020 is either superfluous, or used to deflect a main beam of the laser light before being split for producing the scattered windows.

In some embodiments of the invention no DOE is physically present next to the SLM. Rather, the SLM is controlled to produce a hologram of an object, as viewed through a DOE, producing the same effect as a DOE but without the actual component. Proper calculation of the modulation of the SLM array saves using an optical component.

In some embodiments of the invention the image 1040 produced by each of the portions of the SLM is of a same object at a same location and positioned in a same direction.

In some embodiments of the invention the image 1040 produced by each of the portions of the SLM is of a same object at a same location and positioned in a same direction, as viewed from the directions of the different scattered windows.

An engineering tradeoff is manifested in the above example embodiment. Splitting the SLM into portions provides scattered observation windows, which increases the area from which a hologram can be seen, and decreases maximum resolution possible for the hologram.

Figure 10B:
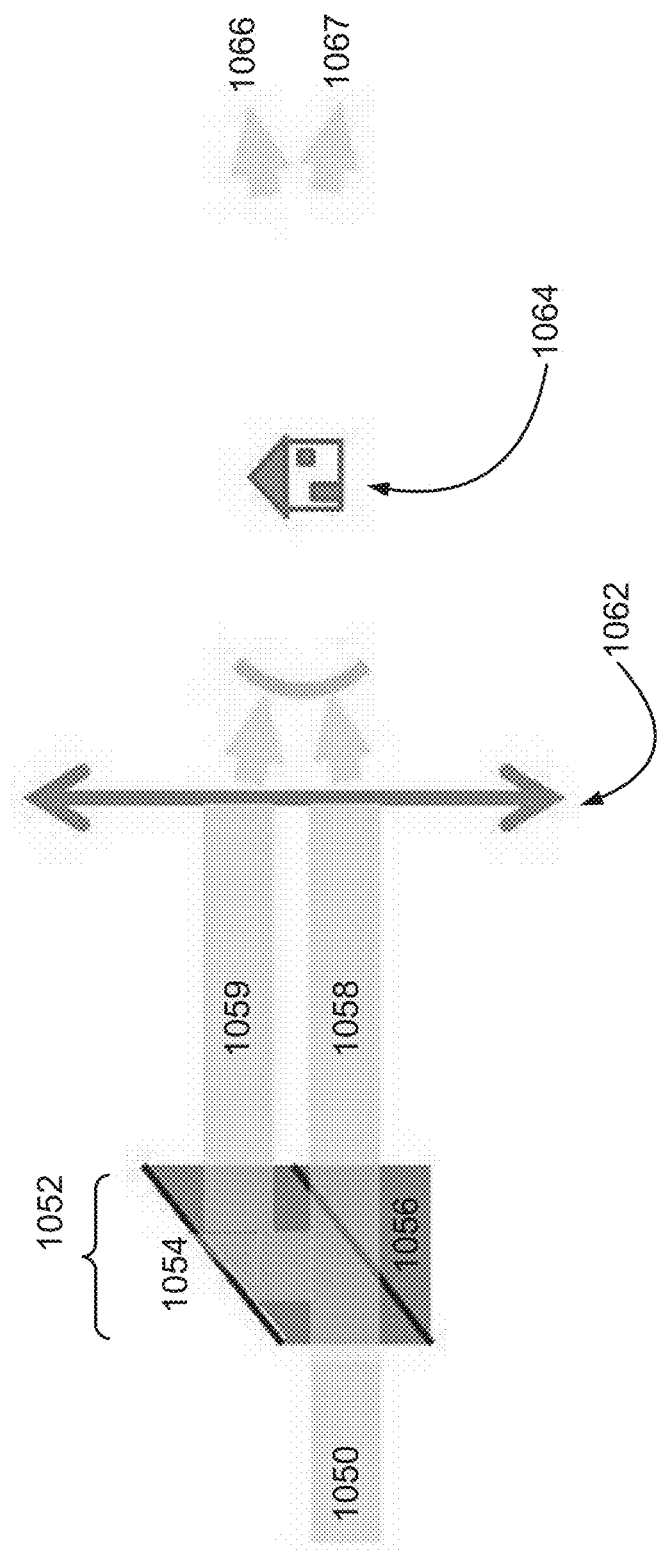
FIG. 10B is a simplified example embodiment of the invention used to produce to scattered observation windows.

Reference is now made to FIG. 10B, which is a simplified example embodiment of the invention used to produce scattered observation windows.

FIG. 10B depicts a combination 1062 of a beam splitter 1066 and a mirror 1064 used to split an input beam 1060 to two optionally parallel beams 1058 1059.

FIG. 10B also depicts an optional lens 1062, which optionally focuses the beams 1058 1059 both producing a Fourier image 1064, optionally at a same location yet diverging in different directions 1066 1067, and producing scattered observation windows (not shown).

In some embodiments of the invention, the output beams all have equal intensity. Having equal intensity is optionally desirable so that a viewer sees a CGH via different scattered observation windows at equal intensity.

In some embodiments, a distance of a first observing window of a first output beam from a second observing window of a second output beam is less than a size of an observer's input pupil.

In some embodiments, the first observing window of the first output beam adjoins the second observing window of the second output beam.

An engineering tradeoff is manifested in the above example embodiment. Splitting the input beam provides scattered observation windows, which increases the area from which a hologram can be seen, and may decrease brightness of the hologram.

Figure 11:
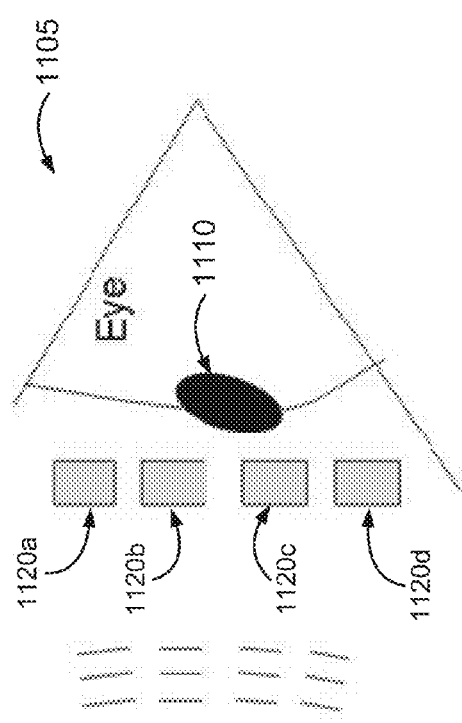
FIG. 11 is a simplified illustration of an observer's eye in relationship to scattered windows produced according to an example embodiment of the present invention.

Reference is now made to FIG. 11, which is a simplified illustration of an observer's eye in relationship to scattered windows produced according to an example embodiment of the present invention.

FIG. 11 depicts a rough drawing of an observer's eye 1105, within which is also drawn the observer's pupil 1110. Four scattered observation windows 1120a 1120b 1120c 1120d are drawn more or less to scale near the eye 1105.

FIG. 11 depicts an example embodiment of the invention in which each one of the scattered observation windows 1120a 1120b 1120c 1120d optionally displays an image having a resolution of 500×500 pixels produced by a 500× 500 pixel portion of an SLM.

The size of each one of the scattered windows 1120a 1120b 1120c 1120d is approximately 0.625 millimeters per side.

Each one of the scattered observation windows is optionally separated by 2 millimeters from its neighboring observation window, producing an effective observing window of 5.25 millimeters×10.5 millimeters, or an angle of approximately 1.14 degrees, in an embodiment using a 1,000×2,000 pixel SLM, and an effective observing window of 10.5 millimeters×21 millimeters, or an angle of approximately 2.3 degrees, in an embodiment using a 2,000×4,000 pixel SLM.

In some embodiments of the invention the same CGH is observed from all the scattered observation windows.

In some embodiments of the invention, scattered observation windows are also shifted, combining the devices and methods taught for shifting with the devices and methods taught for producing scattered windows.

Some example embodiments of the invention are now described in terms of a method for increasing an observing window of a computer generated hologram.

Figure 12:
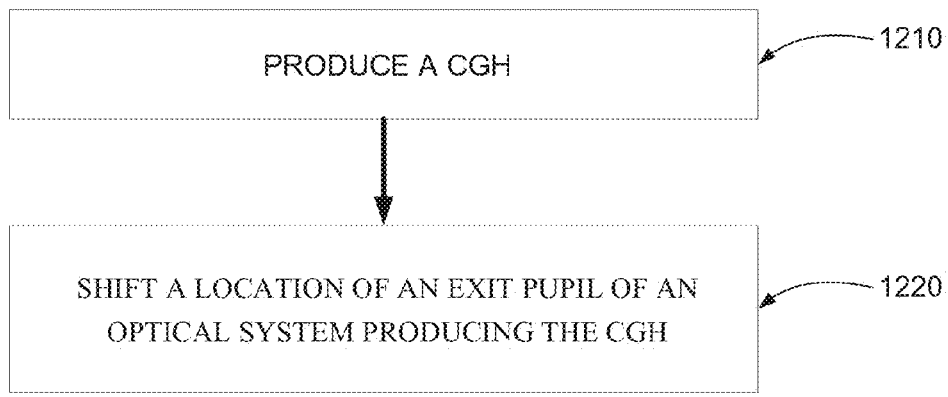
FIG. 12 is a simplified flow chart illustration of a method for enlarging an observation window from which a Computer Generated Hologram (CGH) may be viewed, according to an example embodiment of the invention.

Reference is now made to FIG. 12, which is a simplified flow chart illustration of a method for enlarging an observation window from which a Computer Generated Hologram (CGH) may be viewed, according to an example embodiment of the invention.

The method depicted in FIG. 12 includes:
producing a CGH (1210); and
shifting a location of an exit pupil of an optical system producing the CGH (1220) while maintaining a same location of a scene displayed by the CGH.

In some embodiments the shifting includes deflecting a direction of projection of the observing window of the CGH.

In some embodiments the observation window is enlarged along a viewing direction.

In some embodiments, the observation window is enlarged along a viewing direction by jittering an optical element along the direction of a central ray of the projection.

In some embodiments the increased viewing angle corresponds to an observing window larger than an observer's input pupil.

In some embodiments the producing a CGH includes illuminating a computer controlled Spatial Light Modulator (SLM) using coherent light, thereby modulating the coherent light.

Figure 13:
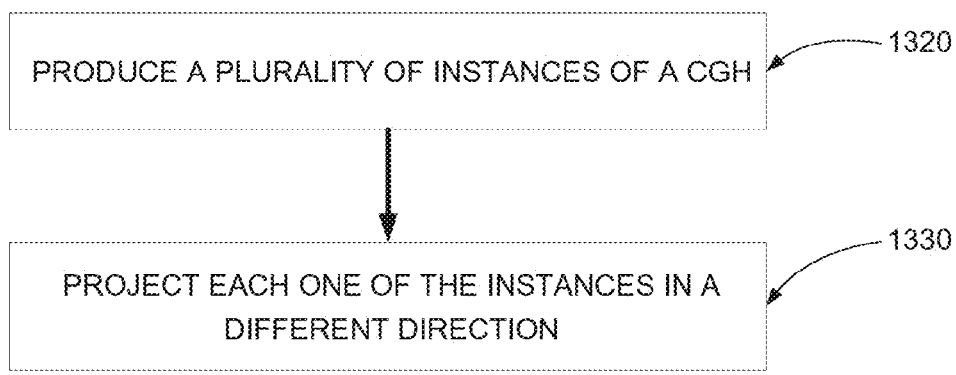
FIG. 13 is a simplified flow chart illustration of a method for increasing a viewing angle from which a Computer Generated Hologram (CGH) may be seen, according to an example embodiment of the invention.

Reference is now made to FIG. 13, which is a simplified flow chart illustration of a method for increasing a viewing angle from which a Computer Generated Hologram (CGH) may be seen, according to an example embodiment of the invention.

The method depicted in FIG. 13 includes:
producing a plurality of instances of a CGH (1320);
projecting each one of the instances in a different direction (1330) so that a first exit pupil of a first instance is close to a second exit pupil of a second instance, and optionally does not overlap the second exit pupil of the second instance.

Figure 14:
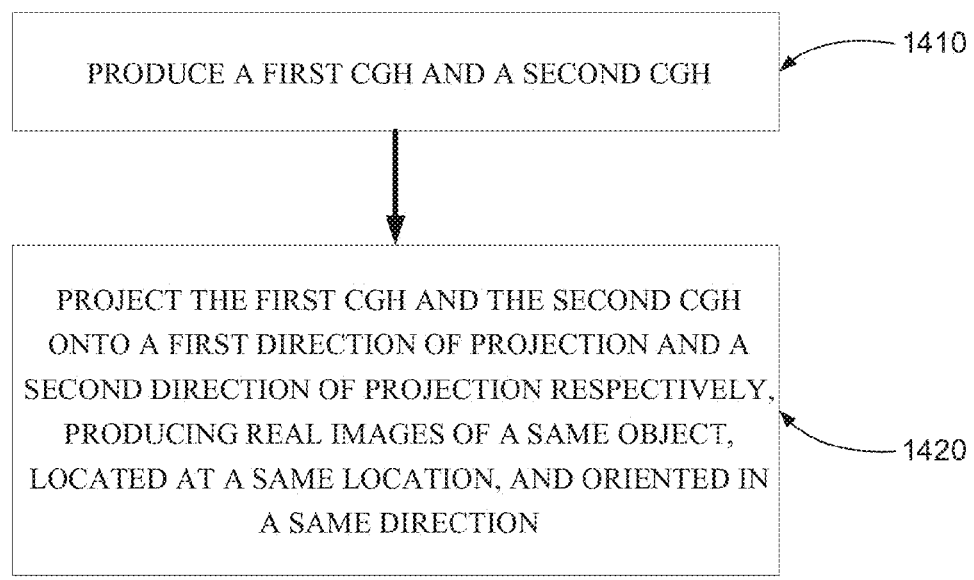
FIG. 14 is a simplified flow chart illustration of a method of increasing a viewing angle from which a Computer Generated Hologram (CGH) may be seen, according to an example embodiment of the invention.

Reference is now made to FIG. 14, which is a simplified flow chart illustration to of a method of increasing a viewing angle from which a Computer Generated Hologram (CGH) may be seen, according to an example embodiment of the invention.

The method of FIG. 14 includes:
producing a first CGH and a second CGH (1410);
projecting the first CGH and the second CGH onto a first direction of projection and a second direction of projection respectively, producing a first real image and a second real image of a same object, located at a same location, the real images oriented in a same direction, at a first observation window corresponding to the first real image and a second observation window corresponding to the second real image (1420).

It is expected that during the life of a patent maturing from this application many relevant Spatial Light Modulators (SLMs) will be developed and the scope of the term SLM is intended to include all such new technologies a priori.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example" or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format to is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or to identification of any reference in this application shall not be construed as an admission that such reference is available as prior art to the present invention. To the extent that section headings are used, they should not be construed as necessarily limiting.

What is claimed is:

1. A method of enlarging an observation window of a projection system for displaying a Computer Generated Holographic (CGH) image, comprising:
   producing a CGH image;
   projecting the CGH image using an optical system, thereby producing an observation window from which the CGH image may be viewed by an observer;
   using an image deflector optically coupled to the optical system to jitter a location of the observation window of the CGH image relative to a direction of an observer pupil location, thereby enlarging the observation window; and
   controlling the jittering of the image deflector to keep the observation window at least partially overlapping the observer pupil during the jittering.

2. The method of claim 1, in which an area of the observation window is enlarged laterally by jittering a direction of projection of the observation window relative to a direction of the observer pupil location.

3. The method of claim 2, in which an area of the observation window is enlarged along a viewing direction by jittering the observation window along the direction of projection of the CGH image.

4. The method of claim 3, and further comprising:
   tracking a distance of an observer from the optical system used to project the CGH image;
   shifting the observation window to correspond to the distance of the observer from the optical system; and
   jittering the observation window along a direction to the observer.

5. The method of claim 2, in which the area of the observation window, at the observer distance, is doubled.

6. The method of claim 2, in which the jittering comprises jittering the direction in two dimensions.

7. The method of claim 6, in which the image deflector comprises one of a group consisting of:
   a mirror;
   a prism; and
   a tilted optical window.

8. The method of claim 2, in which the jittering is performed by jittering a deflection direction of the image deflector, and wherein the image deflector is located at a location of a real CGH image.

9. The method of claim 1, in which the producing a CGH image comprises projecting coherent light from a plurality of coherent light sources having a plurality of different colors onto one or more SLMs, thereby producing a plurality of different colored CGH images, and jittering locations of observation windows of the different colored CGH images relative to the observer location to substantially overlap the different colored CGH image observation windows.

10. The method of claim 1, in which if the jittering comprises jittering a direction of the observation window relative to the observer location by an angle smaller than a threshold angle, a computer generated hologram for producing the CGH image is not changed to compensate for the change in direction.

11. The method of claim 1 wherein the observer pupil is kept at least partially inside the observation window over several cycles of jittering back and forth.

12. The method of claim 1 wherein the observer pupil is kept entirely inside the observation window during jittering.

13. The method of claim 1 wherein the direction of the observer's location is a direction of the observer pupil.

14. The method of claim 1 wherein controlling the jittering of the image deflector comprises controlling the jittering so that a first instance of the observation window of the CGH image overlaps a second instance of the observation window during the jittering.

15. The method of claim 1 and further comprising tracking a viewer's eye, and wherein jittering the location of the observation window of the CGH image relative to the direction of the observer pupil location comprises jittering an exit pupil of the optical system relative to the tracked direction of the viewer's eye pupil.

16. The method of claim 1 wherein the jittering is performed at a rate which is higher than a rate of refresh producing the CGH image.

17. Apparatus for projecting a Computer Generated Holographic (CGH) image, comprising:
   a coherent light source;
   a computer controlled Spatial Light Modulator (SLM) arranged to modulate the coherent light arranged to diffractively produce a CGH image;
   an optical system arranged to project the CGH image, thereby producing an observation window from which the CGH image may be viewed by an observer; and
   an optical element optically coupled to the optical system and arranged to cause a jitter of a location of the observation window of the CGH image relative to a direction of the observer pupil location and to keep the observation window at least partially overlapping the observer pupil during the jittering.

18. The apparatus of claim 17, in which the optical element is configured to jitter a direction of projection of the observation window laterally relative to a direction of the observer pupil location, to laterally enlarge an area of the observation window.

19. The apparatus of claim 18, in which the optical element is adapted to jitter light in two dimensions.

20. The apparatus of claim 17, in which the optical element is configured to jitter the location of the observation window of the CGH image along a direction of a central ray of the projection of the CGH image.

* * * * *